(12) United States Patent
Bohannon et al.

(10) Patent No.: US 6,449,623 B1
(45) Date of Patent: Sep. 10, 2002

(54) METHOD AND APPARATUS FOR DETECTING AND RECOVERING FROM DATA CORRUPTION OF A DATABASE VIA READ LOGGING

(75) Inventors: Philip L. Bohannon, Morris; Rajeev Rastogi, Union; Srinivasan Seshadri, Basking Ridge; Abraham Silberschatz, Union, all of NJ (US); Sundararajarao Sudarshan, Bombay (IN)

(73) Assignee: Lucent Technologies Inc,, Murray Hill, NJ (US)

( * ) Notice: Subject to any disclaimer, the term of this patent is extended or adjusted under 35 U.S.C. 154(b) by 0 days.

(21) Appl. No.: 09/207,927

(22) Filed: Dec. 9, 1998

Related U.S. Application Data

(60) Provisional application No. 60/099,265, filed on Sep. 4, 1998, and provisional application No. 60/099,271, filed on Sep. 4, 1998.

(51) Int. Cl.[7] ............................................. G06F 12/00
(52) U.S. Cl. ...................................................... 707/202
(58) Field of Search .............................. 707/200, 202, 707/204

(56) References Cited

U.S. PATENT DOCUMENTS

| | | | | |
|---|---|---|---|---|
| 4,438,494 A | * | 3/1984 | Budde et al. .................... 714/2 |
| 5,278,982 A | * | 1/1994 | Daniels et al. ............... 395/600 |
| 5,504,858 A | * | 4/1996 | Ellis et al. ....................... 714/6 |
| 5,524,205 A | * | 6/1996 | Lomet et al. ............ 395/182.14 |
| 5,581,690 A | * | 12/1996 | Ellis et al. .............. 395/182.04 |
| 5,684,944 A | * | 11/1997 | Lubbers et al. ........ 395/182.04 |
| 5,727,206 A | * | 3/1998 | Fish et al. .................... 395/618 |
| 5,734,894 A | * | 3/1998 | Adamson et al. ........... 395/616 |
| 5,758,150 A | * | 5/1998 | Bell et al. .................... 395/610 |
| 5,778,387 A | * | 7/1998 | Wilkerson et al. .......... 707/202 |
| 5,778,395 A | * | 7/1998 | Whiting et al. ............. 707/204 |
| 5,832,526 A | * | 11/1998 | Schuyler ...................... 707/205 |
| 5,845,292 A | * | 12/1998 | Bohannon et al. .......... 707/202 |
| 5,857,208 A | * | 1/1999 | Ofek ........................... 707/204 |
| 5,864,849 A | * | 1/1999 | Bohannon et al. ............. 707/8 |
| 5,870,758 A | * | 2/1999 | Bamford et al. ............ 707/201 |
| 5,872,966 A | * | 2/1999 | Burg ........................... 709/213 |
| 5,978,791 A | * | 11/1999 | Farber et al. ................... 707/2 |
| 6,016,500 A | * | 1/2000 | Waldo et al. ................ 707/202 |
| 6,041,423 A | * | 3/2000 | Tsukerman ................... 714/19 |
| 6,189,011 B1 | * | 2/2001 | Lim et al. .................... 707/102 |

* cited by examiner

Primary Examiner—James P. Trammell
Assistant Examiner—Mary Wang
(74) Attorney, Agent, or Firm—Morgan & Finnegan

(57) ABSTRACT

A method of detecting and recovering from data corruption of a database is characterized by the step of logging information about reads of a database in memory to detect errors in data of the database, wherein said errors in data of said database arise from one of bad writes of data to the database, of erroneous input of data to the database by users and of logical errors in code of a transaction. The read logging method may be implemented in a plurality of database recovery models including a cache-recovery model, a prior state model a redo-transaction model and a delete transaction model. In the delete transaction model, it is assumed that logical information is not available to allow a redo of transactions after a possible error and the effects of transactions that read corrupted data are deleted from history and any data written by a transaction reading Ararat data is treated as corrupted.

60 Claims, 7 Drawing Sheets

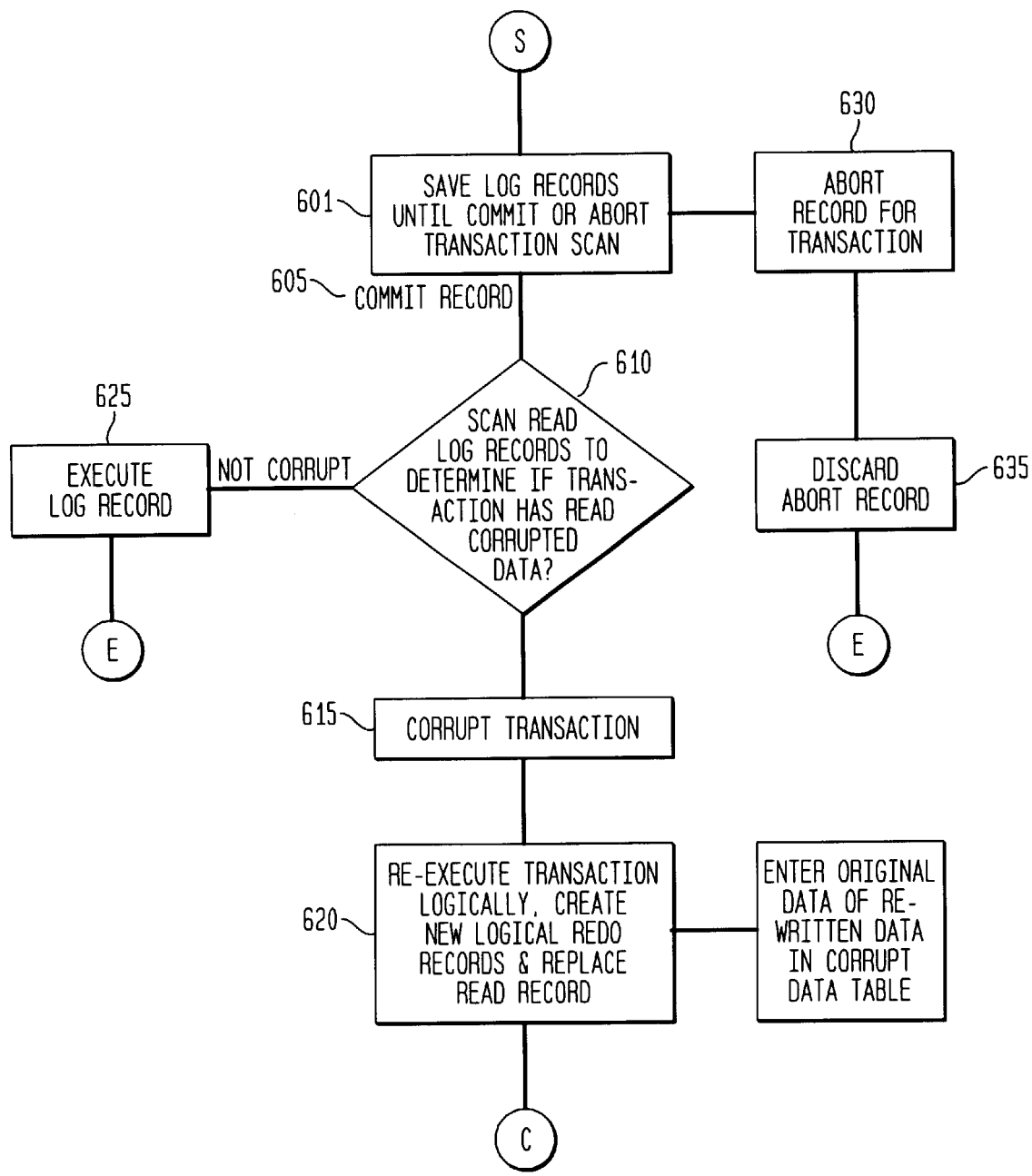

METHOD AND APPARATUS FOR DETECTING AND RECOVERING FROM DATA CORRUPTION OF A DATABASE VIA READ LOGGING

This application claims priority and is related by subject matter to U.S. application Ser. No. 08/767,048, entitled "System And Method For Restoring A Multiple Checkpointed Database In View Of Loss Of Volatile Memory" of Bohannon et al., filed Dec. 16, 1996, issued Jan. 26, 1999 (now U.S. Pat. No. 5,864,849) and to U.S. provisional patent application Ser. Nos. 60/099,265 and 60/099,271, filed Sep. 4, 1998 of Bohannon et al.

BACKGROUND OF THE INVENTION

1. Technical Field

The present invention relates to the field of database management systems generally and, more particularly, to method and apparatus for detecting and recovering from data corruption of a database by codewording regions of the database and by logging information about reads of the database.

2. Description of the Related Arts

A database is a collection of data organized usefully and fundamental to many software applications. The database is associated with a database manager and together with its software application comprises a database management system (DBMS). In recent years, extensible database systems such as illustrate (now part of the Informix Universal Server) have been developed which allow the integration of application code with database system code. In these systems, the application code has direct access to the buffer cache and other internal structures of the DBMS. Similarly, application programs in many object oriented database (OODB) systems have direct access to an object cache in their address space. This OODB architecture was developed to minimize the cost of accesses to data, for example, to support the needs of Computer Aided Design (CAD) systems. Also, several recently developed storage management systems provide memory resident or memory mapped architectures. For example, the Dali main-memory storage manager described in Bohannon et al., "The Architecture of the Dali Main-Memory Storage Manager," *Journal of Multimedia Tools and Applications*, 4(2), pp. 115–151 (1997) is designed to provide applications with fast, direct access to data by keeping the entire database in volatile main memory. In all these systems, direct access to data (either in the database buffer cache or in a memory-mapped portion of the database) by application programs is critical to providing fast response times. The alternative to memory mapping is to access data via a server process, but this presents an unacceptable solution due to the high cost of inter-process communication. Application code is typically less trustworthy than database system code, and there is therefore a significant risk that "wild writes" and other programming errors can affect persistent data in systems that allow applications to access such data directly. Since the systems described above are increasingly popular, the risk of wild writes and associated physical corruption is growing. Additionally, there is a risk of damage due to software faults in the DBMS itself. It is therefore important to develop techniques that can mitigate the risk of corruption.

In our parent U.S. patent application Ser. No. 08/66,096, filed Dec. 16, 1996 and entitled "System and Method for Restoring a Distributed Checkpointed Database," we describe the application of multiple checkpoints and the maintenance of a stable log record stored on a server for tracking operations to be made to the multiple checkpoints in a distributed environment. A companion parent application, U.S. patent application Ser. No. 08/67,048, entitled "System and Method for Restoring a Multiple Checkpointed Database in View of Loss of Volatile Memory" filed the same day describes recovery processes at multiple levels of a DBMS in the event of loss of volatile memory. The '048 and the '096 applications should be deemed to be incorporated by reference herein as to their entire contents. Both of these applications relate to the preservation and restoration of a database (or distributed database), for example, stored in main volatile memory of a data processor.

The problem of detecting and recovering from corruption of data in a database system still remains to be solved in a pragmatic manner without adding considerable overhead to the DBMS. Data corruption may be physical or logical and it may be direct or indirect. Data is "directly" corrupted in a physical corruption sense by "unintended" updates, such as wild writes as explained above due to programming errors in the physical case, or arising from incorrectly coded updates or input errors (human errors) in the logical case. Once data is directly corrupted, it may be read by a process, which then issues writes based on the value read. Data written in this manner is indirectly corrupted, and the process involved is said to have carried the corruption. While this process may be a database maintenance process, we focus on transaction-carried corruption, a problem in which the carrying process is executing transactions.

Direct physical corruption can be mostly prevented with hardware memory protection, using the virtual memory support provided by most operating systems. One approach involves mapping the entire database in a protected mode, and selectively un-protecting and re-protecting pages as they are updated. However, this can be very expensive, for example, on standard UNIX systems. An alternative to the hardware approach would be programming language techniques such as type-safe languages or sandboxing. (Sandboxing is a technique whereby an assembly language programmer adds code immediately before a write to ensure that the instruction is not affecting protected space.) However, type-safe languages have yet to be proven in high-performance situations, and sandboxing may perform poorly on certain architectures. Finally, communication across process domain boundaries to a database server process provides protection, but such communication is orders of magnitude slower than access in the same process space, even with highly tuned implementations. The concern over physical corruption is further motivated by the increasing number of systems in which application code has direct access to system buffers, including extensible systems, object databases, and memory-mapped or in-memory architectures. Finally, some work has raised concern over damage to data due to faults in the DBMS itself.

Integrity constraints are widely studied and prevent certain cases of logical corruption in which rules about the data would be violated. However, it is an object of the present invention to deal with those cases in which integrity constraints and other input validation techniques fail, and whether due to programming error or invalid input, unintended updates are made to the database. We consider such cases inherently impossible to prevent, and instead assume that the problem is detected later, usually when a database user notices incorrect output (on a bank statement, for example).

In the field of accounting systems and audits, it is known from L. A. Bjork, Jr., "Generalized Audit Trail Requirements and Concepts for Data Base Applications", *IBM Systems Journal*, No. 3, 1975, pp. 229–245, how to create and maintain an audit trail—a history of activities by transaction, posted because of operations on specific data. Bjork describes that a time dimension can be added to a stored record such that supplemental information in the form of a descriptor and time frame are maintained. For example, the time frame when the information was created and stored, and each version of a data field, is maintained along with the action. He refers to "create" (creation of data), "reference" (when reference is made to x at time t), and update (when created data is updated) as descriptors all having time dimension. A further descriptor is "refer to prior generation" (when data now updated is referred to by a prior generation." Also, C. T. Davies, Jr. in his article "Data Processing Spheres of Control" appearing in the *IBM Systems Journal*, Vol. 17, No. 2, 1978, pp. 179–198 describes "in-process recovery" as the control of recording and subsequent use of data required to return to a previous point in a process, and that the process that created or last modified data elements be determined from a journal. System recovery is obtained via establishing checkpoints that represent an early state in a data base. Once a search backward is conducted to find an error, a checkpoint behind the error is obtained from which to rebuild. These accounting processes, for example, typified by the recovery from a payroll error, are not examined by Bjork or Davies for the generic case of database recovery, nor are they automated. Bjork and Davies provide no suggestions for real-time implementation, for example, of a read-logging recovery system such as would be required in a communications system and associated record-keeping environment.

Thus, there appears a genuine need in the art of database management systems to provide an improved method and apparatus for detecting and recovering from corruption of a database via read logging.

SUMMARY OF THE INVENTION

According to the present invention, it is a principle to apply several new techniques for the prevention or detection of corruption. The new techniques may be suitable for application in a real-time environment such as in a telecommunications system.

For detecting indirect logical or physical corruption, it is a feature of the present invention to log information about reads (Read Logging). Interestingly, any negative impact of Read Logging is limited, as the actual values read are not logged according to one embodiment of the present invention, just the identity of the item read and optionally a checksum of the value. Moreover, it is an extension of the present invention to store codewords for each read of the read log records.

When corruption is detected rather than prevented, techniques for corruption recovery are employed to restore the database to an uncorrupted state. As will be further described herein, once codewording of data and read logging is performed, models and algorithms are presented for recovery from transaction-carried indirect corruption. In these models, the read log records are preferably combined with known write log records and operated on more efficiently as a combined log to detect and recover from transaction based corruption (although in other embodiments of the present invention, the read log and write log records may be separately maintained.) One model, the redo-transaction model, uses logical descriptions of transactions to repair the database state. A second model, the delete-transaction model, focuses on removing the effects of corruption from the database image. The algorithms presented herein can be applied to recovery from logical or physical corruption. In addition, tracing techniques are presented which aid in determining the scope of logical corruption.

To ascertain the performance of our algorithms for detecting and recovering from physical corruption, we have studied the impact of these schemes on a TPC-B style workload implemented in the Dali main-memory storage manager. Our goal was to evaluate the relative impact on normal processing of schemes that can be easily ported across a variety of architectures and operating systems. In addition to our schemes, we study a hardware-based protection technique. For detection of direct corruption, the overheads imposed cause throughput of update transactions to be decreased by 8%. Prevention of transaction-carried corruption with Read Prechecking costs between 12% and 72%, but requires a significant space overhead to achieve the better performance numbers. Detection of transaction-carried corruption with Read Logging costs between 17% and 22%. Our study indicates that the corruption prevention algorithms of Sullivan et al., "Using Write Protected Data Structures to Improve Fault Tolerance in Highly Available DBMS" in *Proceedings of the International Conference on Very Large Databases*, pp 171–179, 1991, when using standard OS support for memory protection, decrease throughput by about 38%. Thus, the codeword and read logging based detection and prevention schemes of the present invention perform significantly better than the hardware-based protection.

With the present invention, it is possible to identify a subset of the later transactions that were (directly or indirectly) affected by the error, and to selectively roll them back and redo them manually (or even automatically in some cases). Also, the techniques of the present invention are language and instruction-set independent.

Thus, a method of detecting and recovering from data corruption of a database according to the present invention is characterized by the step of logging information about reads of a database to detect and recover from physical corruption of the data in the database, wherein the physical corruption arises from bad writes of data to the database or arises indirectly from the bad writes. In a delete transaction model, the corruption recovery comprises first and second phases, a first redo phase followed by an undo phase. In another embodiment, a method of detecting and recovering from database corruption comprises the steps of logging information about reads of a database to detect and recover from logical corruption, maintaining a logical redo log and storing user inputs for a transaction in the logical redo log. Alternatively, in the logical corruption recovery method, the method comprises the step of logging a checksum. of a logical state found.

In our co-pending, concurrently filed patent application, we describe a Read Prechecking scheme that associates one word codewords with each region of data, and prevents transaction-carried corruption by verifying that the codeword matches the data each time it is read. A Data Codeword scheme, a less expensive variant of Read Prechecking, allows detection of direct physical corruption by asynchronously auditing the codewords. This scheme is also referred to herein and in our co-pending application as deferred codeword maintenance and involves performing codeword updates during a process called "log flushing" at the same time as data is flushed to disc from main memory. These schemes are disclosed and claimed in concurrently filed, copending U.S. patent application Ser. No. 60/099,271 entitled "Method and Apparatus for Detecting and Recovering from Data Corruption via Read Prechecking and Deferred Maintenance of Codewords," of the same inventors.

These and other features of the present invention will be best understood from considering the drawings and the following detailed description of the preferred embodiments.

BRIEF DESCRIPTION OF THE DRAWINGS

FIG. 6 comprises an alternative algorithmic approach to recovery for the redo-transaction model.

DETAILED DESCRIPTION OF THE PRESENT INVENTION

Introduction

Figure 1:
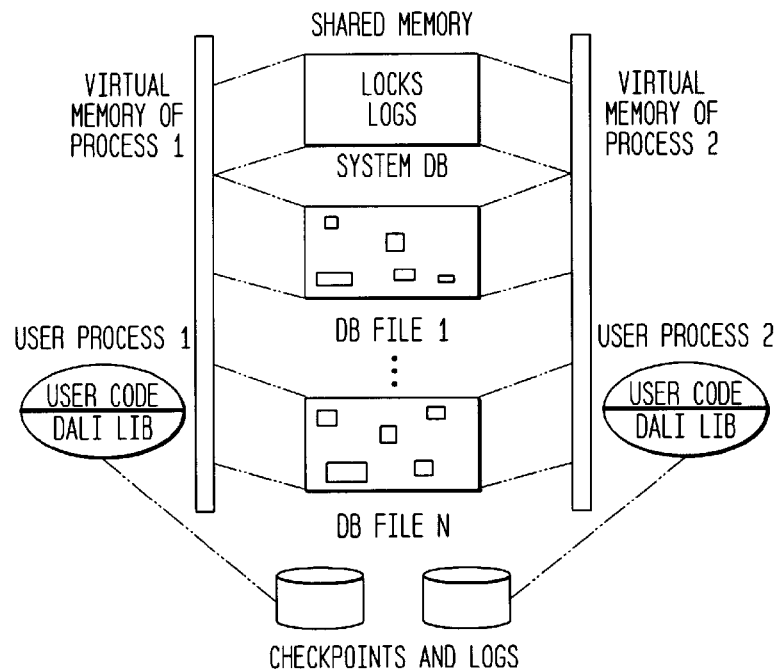
FIG. 1 is a functional schematic drawing of the overall architecture of the Dali main memory storage manager useful for explaining an implementation of the present invention.

Referring briefly to FIG. 1, there is shown an overall architecture of the Dali storage 2 manager on which the present invention has been implemented. The Dali system should be considered only an exemplary implementation of the present invention and the present detection and recovery algorithms may be applied in other architectures as well. The database in a Dali system consists of one or more database files, along with a special system database file. User data itself is stored in database files while all data related to database support, such as log and lock data, is stored in the system database file. This enables storage allocation routines to be uniformly used for persistent user data as well as non-persistent system data like locks and logs. The Dali system database file also persistently stores information about the database files in the system.

As shown, database files opened by a process are directly mapped into the address space of that process. In Dali, either memory-mapped files or shared-memory segments can be used to provide this mapping. Different processes may map different sets of database files, and may map the same database file to different locations in their address space.

This feature precludes using virtual memory addresses as physical pointers to data (in database files), but provides two benefits. First, a database file may be easily resized. Second, the total active database space on the system may exceed the addressing space of a single process. This is useful on machines with 32-bit addressing in which physical memory can significantly exceed the amount of memory addressable by a single process. In a 64-bit machine, both of these considerations may be mitigated, so we also consider physical addressing. For example, if a single database file can be limited to the order of 64 gigabytes, then each process can still map close to a billion database files (which can be expected to far exceed the total database space).

There is a single active transaction table (ATT), stored in the system database, that stores redo and undo logs for each active transaction. A dirty page table (dpt) is maintained for the database (also in the system database) which records the pages that have been updated since the last checkpoint. The ATT (with undo logs) and the dirty page table are also stored with each checkpoint. The dirty page table (dpt) in a checkpoint is referred to as ckpt_dpt in the figure.

MODELS AND OVERVIEW

In this section we describe our models of corruption and recovery and the database model in which our algorithms are described.

Models of Corruption

As described above, data corruption may be either direct or indirect, logical or physical. Direct physical corruption is defined to be an update to the in-memory image of database data which did not happen through prescribed methods. For example, in a standard disk-based system, an update to an internal buffer without a latch and without calls to logging routines (usually made via a FixBuffer or similar function call) would constitute direct physical corruption. For applications with direct access to data, such corruption could result due to application errors (e.g., stray pointers in the application code).

Examples of direct logical corruption include any update made in error, for example, an accidental deletion of a customer, updates to account balances made by a program which computed interest incorrectly, or simply entering an incorrect amount for sales commission which is then used in payroll computations. Once direct corruption has occurred, corrupted data may be read by a subsequent transaction. If that transaction, considered a corrupt transaction, then writes other data in the database, that data is also assumed to be corrupt. Note that the newly "corrupted" data may then be read by other transactions, and the corruption propagated further. We call such corruption indirect corruption.

As with corruption of user data, corruption of control structures may be handled with hardware memory protection, or with codeword based techniques.

Models of Recovery

We define four models of corruption recovery: a cache recovery model, a prior-state model, and a redo transaction model and a delete-transaction model. The first model deals only with direct physical corruption. The other models deal with logical and indirect physical corruption.

In the cache-recovery model, corruption is removed from cache pages, assuming that indirect corruption has not occurred, and because of that, corrupt data values are not reflected in any log records.

In the prior-state model, the goal is to return the database to a transaction consistent state prior to the first possible occurrence of corruption. Most commercial systems support this model. Clearly, this recovery model leaves much to be desired, as it may well be impractical to request that users re-submit any work done following the introduction of the corruption.

In an extension of the prior-state model, once the direct error has been identified and corrected, transactions affected by the error must be logically re-run in history; that is, the transactions must be re-run in the same serialization order as the original set of transactions. We call this extension of the prior-state model the redo-transaction model of corruption recovery.

In our final model, the delete-transaction model, we assume that logical information is not available to allow a redo, and corruption is dealt with by deleting the effects of transactions from the database image. Any transaction that read corrupted data must be deleted from history, and any data that such a transaction wrote after reading corrupt data is treated as being corrupted by the transaction.

To implement a recovery algorithm for the delete transaction model, it must be clearly understood what it means to "delete a transaction from history". One possible interpretation would be to allow any serializable execution of the remaining, undeleted, transactions. However, this definition is not acceptable, since the values read by other transactions, and thus the values exposed to the outside world, might change in the modified history.

To define correctness in the delete transaction model, we consider two transaction execution histories, the original history, $H_o$, and the delete history, $H_d$, in which all reads and writes of certain transactions no longer appear. These histories include the values read or written by each operation, and for a given operation, the value read or written in the delete history is the same as in the original history. A delete history is conflict-consistent with the original history if any read in $H_d$ is preceded by the same write which preceded it in $H_o$. Similarly, $H_d$ is view-consistent with $H_o$ if each read in $H_d$ returns the value returned to it in $H_o$. Note that the notions of conflict- or view-consistency are distinct from the standard notions of conflict- or view-equivalence. A correct recovery algorithm in the delete-transaction model recovers the database according to a delete history which is conflict- or view-consistent with the original history. Note that it follows from this definition that in a conflict-consistent delete history, the final state of any data item written by a transaction in the delete set will have the value it had before being written by the first deleted transaction.

Levels of Protection

Having covered the models of corruption and corruption recovery, we now consider different levels of protection. In general, it is possible to prevent or detect either direct or indirect physical corruption. It may further be possible to detect indirect logical corruption, once the fact that a certain transaction introduced the logical corruption has been determined by a human. The human then can initiate appropriate action. In each of these cases, if a form of corruption is detected but not prevented, a recovery mechanism for that corruption should exist.

Note that prevention of direct corruption is equivalent to prevention of all corruption, since other forms only propagate direct corruption. Preventing direct logical corruption is impossible, and preventing direct corruption using hardware may be expensive as discussed above. In the next best alternative, direct corruption is detected and transaction-carried corruption is prevented. Finally, direct corruption and transaction-carried corruption may both be detected. Detecting or preventing only transaction-carried corruption with no detection of direct corruption makes little sense, as the source of the corruption would remain in the database indefinitely. However, detection of only direct physical corruption may be used, if one feels that the corruption will usually be detected and recovery performed before the direct corruption leads to transaction-carried corruption. As unsatisfactory as it seems, such minimal protection is a great improvement over no protection at all. Corrupt data left in the database indefinitely is far more likely to cause problems than corruption removed after a few minutes or even hours.

Some of the schemes we describe below associate a codeword with a region of data known as a protection region. When data in the region is updated through the prescribed interface, the codeword is updated along with the data. By using word-wise parity, or a similar scheme, updates to the codeword can be made based only on the portion of the protection region which was actually updated—the remainder of the region need not be read.

Using Codewords To Detect Corruption

The basic (and well known) idea of codeword-based corruption detection is as follows. Each protection region also stores a codeword for the region. Updates via the prescribed interface also update the codeword for the region (either immediately on update, or in a deferred fashion, as we shall see). If an update not via the prescribed interface occurs, the stored codeword will not be updated. Thus (with a very high probability assuming a good codeword scheme), if we compute the codeword for the region it will not match the stored code (we ensure that the deferred codeword updates have been performed before matching the codewords).

There are several issues in codeword based corruption detection, such as:

When and how to update the codewords (Immediately on update? Deferred to later?)

When and how to check for codeword mismatch (When flushing data to disk or archival copy?)

How to integrate codeword detection with concurrency control and recovery (ensuring concurrency levels stay high; ensuring recoverability from failures).

These issues are addressed later, in Section 5; in this section we introduce some basic requirements on the use of codewords for detecting corruption.

Error detecting codes, such as the Cyclic Redundancy Check (CRC) code are widely used, for example to verify integrity of sectors of disk systems. However, our algorithms have non-standard requirements on the codeword schemes that may be used:

1. It should be possible to update a codeword incrementally when part of the protection region that it covers is updated. In particular, to avoid locking unrelated data and to provide a high degree of concurrency, we must be able to compute the new codeword using only the old value of the codeword, and the old and new values of the part of the region that is updated.

2. Since the actual update of the codeword may be deferred, we require that the effect on the codeword of an update M to part of a region can be summarized as $\Delta(M)$. The update M consists of the old and new values of the updated part of the protection region, and hence $\Delta(M)$ must be a function of only the location and the old and new values of the updated area. In particular, $\Delta(M)$ should not depend on the old codeword. Since in one of our schemes $\Delta(M)$ must be stored in the redo log record, we require that the information in $\Delta(M)$ should be small,.only about as big as the codeword itself. We also assume there is a codeword update operation $\oplus$, such that if the codeword for a region prior to an update M is $C_{old}$, the codeword after the update is $$C_{new} = C_{old} \oplus \Delta(M)$$

We shall assume that there is a value, denoted by 0, that results in no change to the codeword; that is, for all C, we have $C \oplus 0 = C$.

3. There may be a sequence of updates to a region whose $\Delta$s are applied out-of-order to the codeword. We assume that while an update is in progress it has exclusive access to the updated data; such exclusive access can be ensured by means of region locks. Further, the codeword change $\Delta(M)$ is computed while the update M has exclusive access to the updated data. Given the above, we require that for any pair of updates $M_1$ and $M_2$ $$(C \oplus \Delta(M_1)) \oplus \Delta(M_2) = (C \oplus \Delta(M_2)) \oplus \Delta(M_1).$$

We often treat M as if it is composed of two updates, one from the initial value of the updated area U to a value of all zeros, and a second from all zeros to the value R it holds after M. We use $\Delta^-(U)$, which we call the undo value, to denote $\Delta(M')$ where M' is the updated from U to all zeros, while $\Delta^+(R)$, which we call the redo value denotes $\Delta(M'')$ where M'' is the update from all zeros to R.

Thus, we have $C \oplus \Delta(M) = C \oplus \Delta^-(U) \oplus \Delta^+(R)$. We shall assume a function (D that can be used to combine $\Delta^-(U)$ and $\Delta^+(R)$ such that $\Delta(M) = \Delta^-(U) \oplus \Delta^+(R)$.

There are several codeword schemes that satisfy our requirements. One such scheme is parity encoding in which the size of each codeword is one word. The parity code is the bitwise exclusive-or of the words in the region. Thus the i'th bit of the codeword represents the parity of the i'th bit of each word on the region. For the case of parity, $\oplus$, $\oplus$ and $\Delta$ are all the same—they compute bitwise exclusive-or. It is easy to check that the parity code has the properties that we require. In particular, $\Delta(M)$ for an update M simply consists of the exclusive-or of the before-update and after-update values of words involved in the update. Also, $\Delta(M)$ requires only one word of storage.

There are other choices for error-detection codes, for example a summation scheme where the codeword is the word-wise summation of all data on the region modulo $2^{32}$. Any such codeword scheme satisfying our requirements can be used. Our focus here is not on the choice of the best error detecting code, but rather on the integration of such a code with a transaction processing system.

Schemes for Prevention, Detection and Recovery

In this section, we briefly outline the schemes we will present for the respective levels of protection described above.

We begin with schemes which prevent corruption. The Hardware Memory Protection scheme may be used to prevent direct corruption. Furthermore, since the database is not corrupted, no explicit recovery is required. If, however, the performance hit of hardware protection is unacceptable, an alternative is to detect direct physical corruption, while preventing indirect physical corruption. This may be accomplished with the codeword-based scheme of Read Prechecking, in which codewords are associated with regions of the database, and these codewords are checked against the actual contents prior to every read.

Direct physical corruption may be detected rather than prevented with this same codeword arrangement by running periodic audits of the protected data. Based on the performance of Read Prechecking, we recommend using Read Logging to detect transaction-carried corruption. In fact, the use of read logging opens up several new possibilities in error detection and recovery. In particular, if transaction-carried corruption has occurred the read logs provide a way of tracing history and detecting the transactions that were affected by the corruption. Because this ability to trace affected transaction extends to logical corruption, this technique aids in recovery from errors against which the previously known techniques for corruption prevention are ineffective.

Database Model

Figure 2:
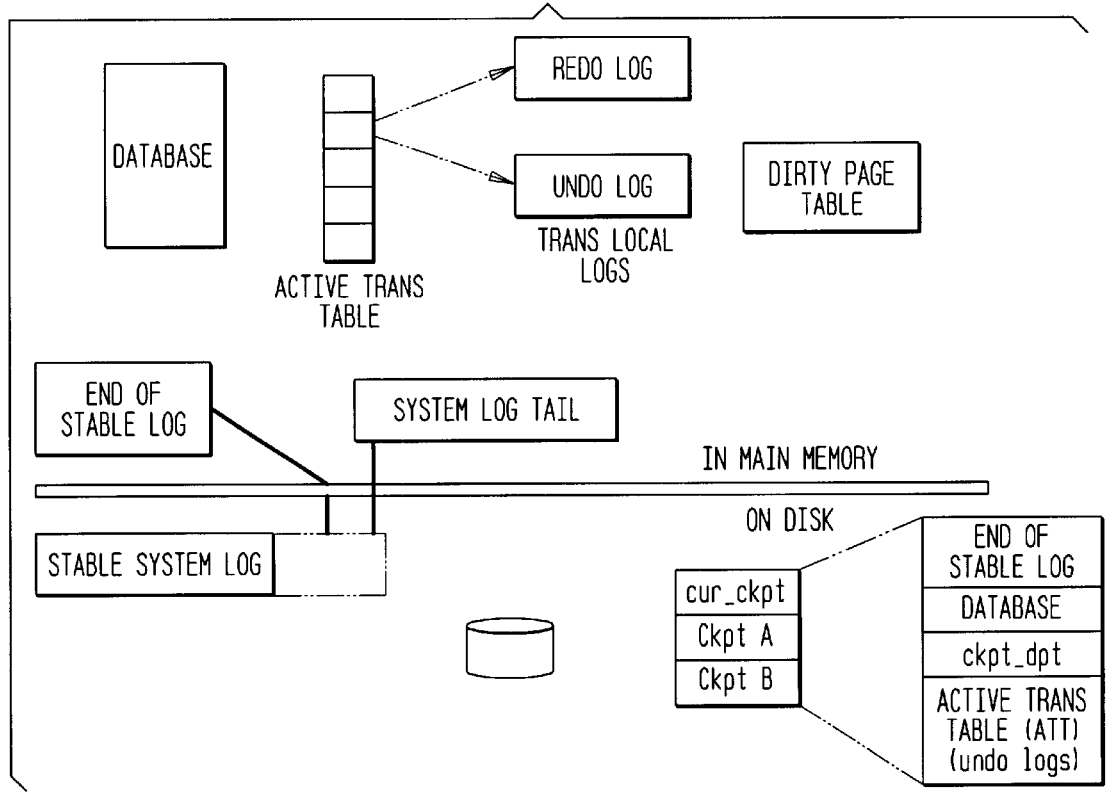
FIG. 2 is a functional block diagram providing an overview of database recovery structures which may be existent, for example, within an architecture of FIG. 1.

FIG. 2 provides an overview of the structures used for recovery. Our corruption detection and recovery algorithms are expressed in terms of the Dali recovery algorithm. The Dali recovery algorithm provides very general support for high concurrency, multi-level operations and minimal interference with transaction processing in a main-memory database system. More details can be found in our companion applications and our article describing the Dali main memory manager, "The Architecture of the Dali Main-Memory Storage Manager, referred to above and incorporated herein by reference.

Multi-level Recovery: Dali implements a main-memory version of multi-level recovery. A multi-level transaction processing system consists of n logical levels of abstraction, with operations at each level invoking operations at lower levels. Transactions themselves are modeled as operations at level n, with level 0 consisting of physical updates. Multi-level recovery permits some locks to be released early to increase concurrency. For example, many systems have two levels defined below the transaction level: a tuple level and a page level. Locks on pages are released early, but locks on tuples are held for transaction duration.

Latching Protocol: In Dali, the extent of physical latching used to protect the lowest level physical updates is left to the database implementor. (Often these physical updates are covered by higher level locks, leading to efficient implementations of concurrency control for main-memory.) Thus, we merely assume that a physical update occurs on a locking region (not to be confused with a protection region, though they may be the same in a given system), which may be a physical space like a page, or a logical space like a linked list or tree. These lowest level updates are assumed to be covered by a region lock.

Undo and Redo Logging: Updates in Dali are done in-place, and updates by a transaction must be bracketed by calls to the functions beginUpdate and endUpdate. Each physical update to a database region generates an undo to part of a locking region image and a redo image for use in transaction abort and crash recovery. Undo and redo logs in Dali are stored on a per-transaction basis (local logging). When a lower-level operation is committed, the redo log records are moved from the local redo log to the system log tail in memory, and the undo information for that operation is replaced with a logical undo record. Both steps take place prior to the release of lower level locks. A copy of the logical undo description is included in the operation commit log record for use in restart recovery. The Dali recovery algorithm repeats history on a physical level, so during undo processing, redo records are generated as for forward processing.

Log Flush: The contents of the system log tail are flushed to the stable system log on disk when a transaction commits, or during a checkpoint. The system log latch must be obtained before performing a flush, so that flushes do not occur concurrently. The stable system log and the tail are together called the system log. The variable end_of_stablelog stores a pointer into the system log such that all records prior to the pointer are known to have been flushed to the stable system log. While flushing physical log records, we also note which pages were written ("dirtied") by the log record. This information about dirty pages is noted in the dirty page table (dpt).

Logical Undo: All redo actions are physical, but when an operation commits, an operation commit log record is added to the redo log, containing logical undo description for that operation. These records are used so that at system recovery, logical undo information is available for all committed operations whose enclosing operation (which may be the transaction itself) has not committed. For transaction rollback during normal execution, the corresponding undo records in the transaction's local undo log are used instead.

Due to the requirements of multi-level recovery, at any point in time a transaction's undo log consists of some number of logical undo actions followed by some number of physical undo actions. If a transaction aborts, it executes the undo log in reverse order.

Transaction Rollback: When a transaction is rolled back during normal operation its local undo log is traversed in reverse order, and the undo descriptions are used to undo operations of the transaction. In the case of physical update operations, the undo is done physically, while in the case of logical operations, the undo is done by executing the undo operation.

Following the philosophy of repeating history, both these actions generate redo logs representing the physical updates taken on their behalf. Additionally, each undo operation also generates redo log records to note the begin and commit of the undo operation, just like a regular operation. At the end of rollback a transaction abort record is written out. indicating that they are an action taken on behalf of an undo log record.

Checkpoints: Again, FIG. 2 provides an overview of the structures used for recovery. The database is mapped into the address space of each process. During a checkpoint, dirty pages from the in-memory database image are written to disk. In fact, two checkpoint images Ckpt_A and Ckpt_B are stored on disk, as is cur_ckpt, an "anchor" pointing to the most recent valid checkpoint image for the database. During subsequent checkpoints, the newly dirty portions of the database are written alternately to the two checkpoint images (this is called ping-pong checkpointing). The anchor is switched to point to the new checkpoint only after checkpointing has been successfully completed.

Thus, even if one checkpoint image is corrupted (due to writing corrupted data during checkpointing or due to failure during checkpointing) the other checkpoint image is still available for recovery.

Information about active transactions is stored in an active transaction table, referred to herein as the ATT. Due to local logging, the entry for each transaction in the ATT contains local undo and redo logs. In addition to the database image, a copy of the ATT with the local undo logs and a copy of the dirty page table (dpt) are stored with each checkpoint.

Note that physical undo information is moved to disk only during a checkpoint. The undo information is taken by the checkpointer directly from the local undo logs of each transaction. (Thus, physical undo log records are never written to disk for transactions which take place between checkpoints.)

Restart Recovery: Restart recovery starts from the last completed checkpoint image, and replays all redo logs (repeating history). When the end of log is reached, incomplete transactions (those without operation commit or abort records) are rolled back, using the logical undo information stored in either the ATT or operation commit log records. Undo information is available in the redo log for all operations at level 1 and higher. For level 0 (physical updates) the undo information is available in the checkpointed undo log. (Or is reconstructed from the checkpoint image during redo.)

Due to multi-level recovery, the rollback is done level by level with all incomplete operations at level i being rolled back before any incomplete actions at level i+1 are rolled back.

PREVENTING CORRUPTION

The prevention of physical corruption can take place at two times—at the time of the direct corruption (the "bad write"), or at the time of an attempt to read the corrupt data (indirect corruption). In this section, we the present the Hardware Protection scheme which takes the first approach, and the Read Prechecking scheme which takes the second.

Hardware Protection

Direct physical corruption can be largely prevented by using virtual memory support provided by most operating systems. The basic approach is to un-protect a page before an access, and re-protect it afterwards. The un-protection and re-protection are done in the database code that surrounds an update, for example, fixing and unfixing a page in the buffer pool. Thus, if an update is done outside of these routines, the page is very likely to be protected, and the hardware mechanism will cause the program to be terminated. If database processes are threaded, however, un-protected pages will be vulnerable to other threads, as hardware memory protection is a per-process resource.

We note that greater speed with less safety may be available if the page is left un-protected for a period of time—until the end of the enclosing operation, or transaction.

Turning protection on and off as above can be very expensive since each protect/un-protect involves a system call (for security reasons), which on most current generation operating systems continues to be very expensive (around 20,000 instructions). For example, on a SPARCStation 20 Model 50, only about 16,000 protect/un-protect pairs can be performed in a second.

While relatively good performance has been obtained, we specially modified a research operating system to take additional advantage of hardware features. We are interested in solutions which are applicable to today's DBMS on a wide variety of standard hardware and operating systems. Unfortunately, system calls and in particular memory protection and un-protection are expensive on these systems, and the problem does not seem likely to get better.

Read Prechecking

An alternative to preventing direct corruption of data is preventing the use of that corrupted data by a transaction. To accomplish this, codewords are maintained for page-sized or smaller regions of data known as protection regions. When data in the region is updated through the prescribed interface, the codeword is updated along with the data. By using word-wise parity, or a similar scheme, updates to the codeword can be made based only on the portion of the protection region which was actually updated—the remainder of the region need not be read. Selection of an encoding and parity protection scheme may be accomplished in any manner known to those in the art appropriate.

In the Read Prechecking scheme, the consistency between the data in a protection region and its codeword is checked during each read of persistent data. This scheme and the Data Codeword scheme for direct corruption detection, described below, both use the same codewords maintained during application updates.

Figure 3:
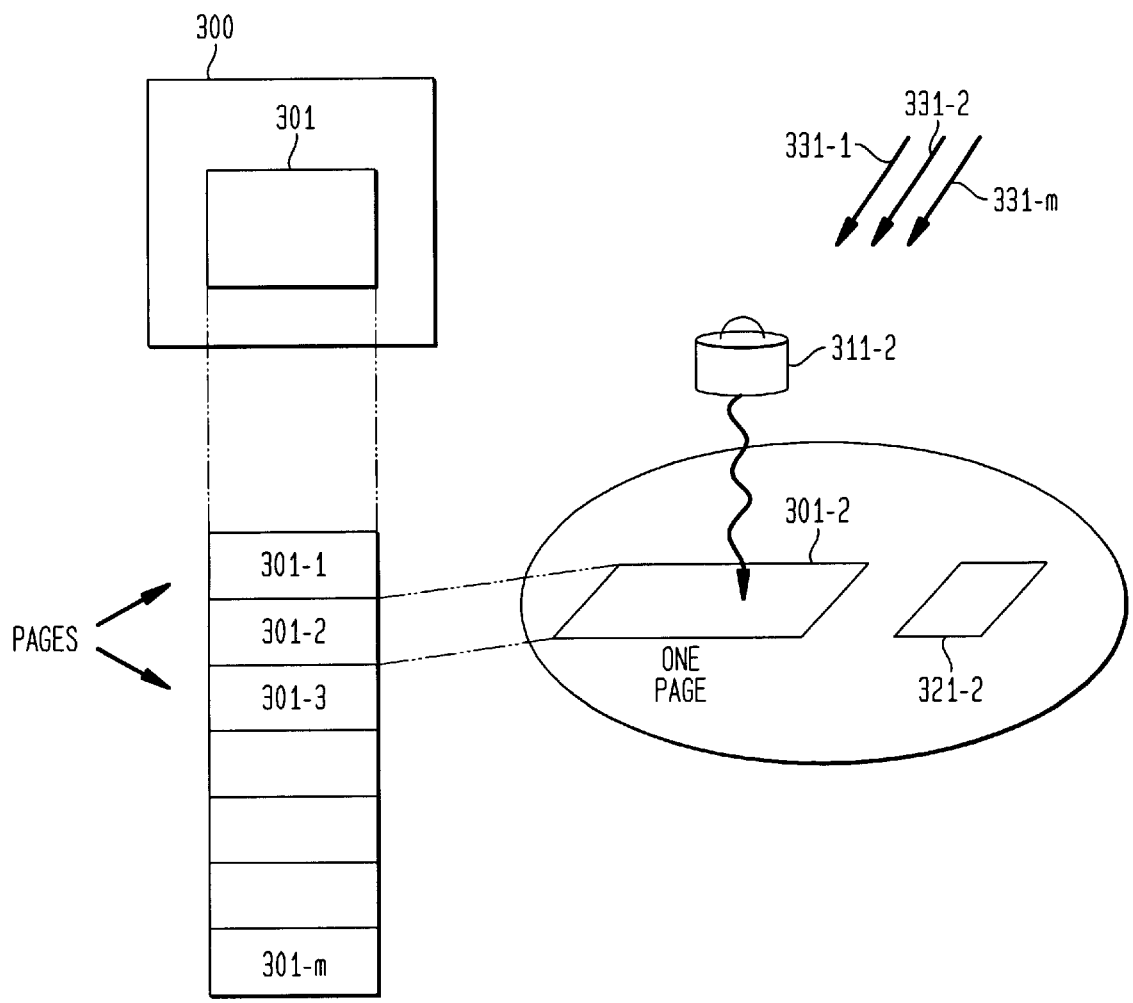
FIG. 3 shows a database memory comprising a plurality of pages and codewords for each page with a latch for processes wanting access to a page or a codeword for that page useful in describing a simple read prechecking scheme.

FIG. 3 shows a database memory 300 comprising a plurality of pages 301-1 to 301-3 and codewords for each page, for example, 321-2 for page 301-2, with a latch 311-2 for processes 331-1 331-2 to 331-n wanting access to a page 301-2 or a codeword 321-2 for that page useful in describing a simple read prechecking scheme. A protection latch, for example, 311-2 is associated with each protection region and acquired exclusively when data is being updated, or when a reader needs to check the region against the codeword. A shared protection latch is associated with each protection region so that, by holding the latch in exclusive mode, the reader can obtain an update consistent image of the region and the codeword. Updates to data in the region hold this latch 311-2 in shared mode, so that updates to different portions of the region may go on concurrently. Each codeword has an associated codeword latch, which is used to serialize updates to the codeword. More than one codeword can share a single latch; the loss in concurrency is not much since codeword updates take very little time, and thus the latch is acquired only for very short durations.

A flag, for example, with the name codeword-applied, is stored in the undo log record for a physical update to indicate whether the change to the codeword has been applied corresponding to the update. This flag allows transaction rollback between a beginUpdate and an endupdate, the functions which, in Dali, bracket a physical update.

We now present the actions taken during normal transaction processing. In the description of steps taken for update and initialization processing, we assume these actions are taken for an update M, made up of an undo U and redo R. For abort processing, $M^{-1}$ is used to represent the inverse update which restores the data to its original value U.

Begin Update: At the beginning of an update, the protection latch for the region is acquired, the undo image of the update is noted in the undo log, and the flag codeword-applied in the undo log record is set to false.

End Update: When an update is completed, the redo image is recorded from the updated region, and the undo image in the undo log record is used with this image to determine the change in the codeword. The codeword is updated with this change, and the operator 9 is used to compute $\Delta(M)$ from the undo image U and redo image R in the log.

The codeword latch is acquired in exclusive mode, and the codeword, C, is changed to $C \oplus \Delta(M)$ and the flag "codeword-applied" in the undo log record for the update is set to true. Finally, the protection latch is released.

Undo Update: When undo processing executes logical actions, the Dali recovery algorithm generates redo log records for updates, just as during normal processing. Correspondingly, the codeword is changed to reflect each update, just as during forward processing. When undo processing encounters a physical undo log record, then it must be handled differently based on whether redo processing had taken place, as represented by the flag codeword-applied in the undo log record. If this flag is set to true, the protection latch is acquired and the codeword for the protection region is modified to back out the update. If the flag is false, no change is made to the codeword, and the protection latch need not be acquired, as it is already held from forward processing. Regardless of the value of the flag, the other undo actions, such as applying the update and generating a log record for the undo, are executed. Finally, the protection latch is released.

Read: To verify the integrity of the data in the protection region, the reader acquires the protection latch for the region, computes the codeword value of the region and compares this with the stored codeword for that region.

In order to prevent corruption from reaching the disk image, the checkpointer performs the same integrity check as the reader. If either a reader or the checkpointer finds that a region does not match the codeword for that region, steps are taken as will be described herein to recover the data from this corruption. Note that since corruption cannot be propagated, recovery under the cache recovery model is sufficient.

Read Prechecking in ARIES

In this section, we describe how the Read Precheck scheme would need to be modified to work on a page-based architecture such as the ARIES system. In ARIES or other page-based systems, the protection region may be chosen to be the page, in which case the page latch can be used as the protection latch. However our performance study indicates that this may not lead to acceptable performance, thus it may be necessary to associate multiple codewords with a given page. The codeword is associated either with the page, for example, if the codeword will be used to check the integrity of disk writes and reads or with the buffer control block (BCB) if otherwise. The "codeword-applied" flag is stored in the BCB. This flag is needed in case rollback occurs between the FixForUpdate and UnFix calls. If rollback cannot occur in this interval, this flag can be dispensed with and the steps below should behave as if it is always set. As mentioned earlier we assume only one update occurs within a FixForUpdate and UnFix pair. Our scheme can be extended easily to allow multiple updates, by tracking a region which is a union of the individual regions, and eliminating overlaps.

The actions taken at various points during an update are described below.

FixForUpdate: First the page is latched in exclusive mode to prevent any concurrent updates on the page or to the codeword of the page. The undo image of the update is then noted in the undo log, and the flag codeword-applied is set to false. At this time, the codeword is updated with $\Delta^-(U)$ (that is, the A for an update which changes the value from U to all zeros) and the region to be updated is noted in the BCB (by storing its offset and length). If the update is physiological (that is, log records that identify a page physically, but record the update to be performed logically as an operation) then, if it is possible to determine an area within the page that may be modified, the offset and length of the area may be stored in the BCB. All updates by the physiological operation must then be within this area. If at this time it is not possible to determine the area affected by the update, the area to be updated is simply assumed to be the entire page.

Let us define M as an update consisting of old and new values of the updated part of a protected region; then, the effect on the codeword for the region lay be defined as $\Delta M$. Then, if we treat M as if it is composed of two updates, one from the initial value of the updated area U to a value of all zeros, and a second from all zeros to the value R it holds after M, then we define $\Delta^-(U)$ as the undo value and $\Delta^+(R)$ as the redo value for the update from all zeros to R.

UnFix: At the UnFix call, if the original fix was for an update, then the updated region R 2V is determined from the region noted in the BCB, and the codeword for the page is updated with $\Delta^+(R)$ (that is, the A for an update which changes the value from all zeros to R). The flag codeword-applied is set. Finally the latch on the page is released.

Undo Update: When undo processing executes logical actions, all codeword updates are done just as for forward processing. When undo processing encounters a physical/physiological undo log record, it must be handled differently based on whether the codeword has been updated during UnFix or not. To do so, if the flag codeword-applied is not set in the BCB, then the abort was called between the FixForUpdate and UnFix. In this case, the update to area during undo is taken to be from all zeros to the old value; thus the codeword update $\Delta^+(U)$ for the restored value U of the affected area is used to update the codeword for the page. In addition the flag "codeword-applied" is set. If the flag codeword-applied was already set, the update is taken to be from the current value to the old value, and the codeword for the page is correspondingly updated.

Page Steal: In order to write out a page, the page latch is acquired in shared mode, and the codeword is computed for the page. This computed codeword is compared with the codeword stored for the page in the BCB, and if they are not equal, then the data in the page has been corrupted. Appropriate corruption recovery actions are then taken, as will be described below.

DETECTING CORRUPTION

In this section, we describe the Data Codeword scheme for detecting direct, physical corruption and the Read Logging scheme for detecting transaction-carried physical and logical corruption.

Data Codeword

Detecting (but not preventing) direct physical corruption can be accomplished with a variant of the Read Prechecking scheme described above. The maintenance of the codewords is accomplished in the same manner, however, the check of the codeword on each read is dropped in favor of periodic audits.

Since transaction carried physical corruption is possible in this scheme, additional care must be taken during checkpointing to ensure that an uncorrupted image exists on disk. The process of auditing is nothing more than an asynchronous check of consistency between the contents of a protection region and the codeword for that region. This can be carried out just as if a read of the region were taking place in the Read Prechecking scheme.

Since prechecks are not being performed, and audits are asynchronous, it makes sense to use significantly larger protection regions. In this case the protection latch may become a concurrency bottleneck. If so, a new latch, the codeword latch, may be introduced to guard the update to the actual codewords, and the protection latch need only be held in shared mode by updaters. During audit, the protection latch must be taken in exclusive mode to obtain a consistent image of the protection region and associated codeword. In particular, data is audited during the propagation to disk by the checkpointer (or page-steal in a page-based system).

Note that this scheme by itself supports only the cache recovery model, thus indirect corruption is not prevented, rather one attempts to audit frequently enough to repair direct physical corruption before it is encountered.

Corruption Detection with Deferred Maintenance

Figure 4A:
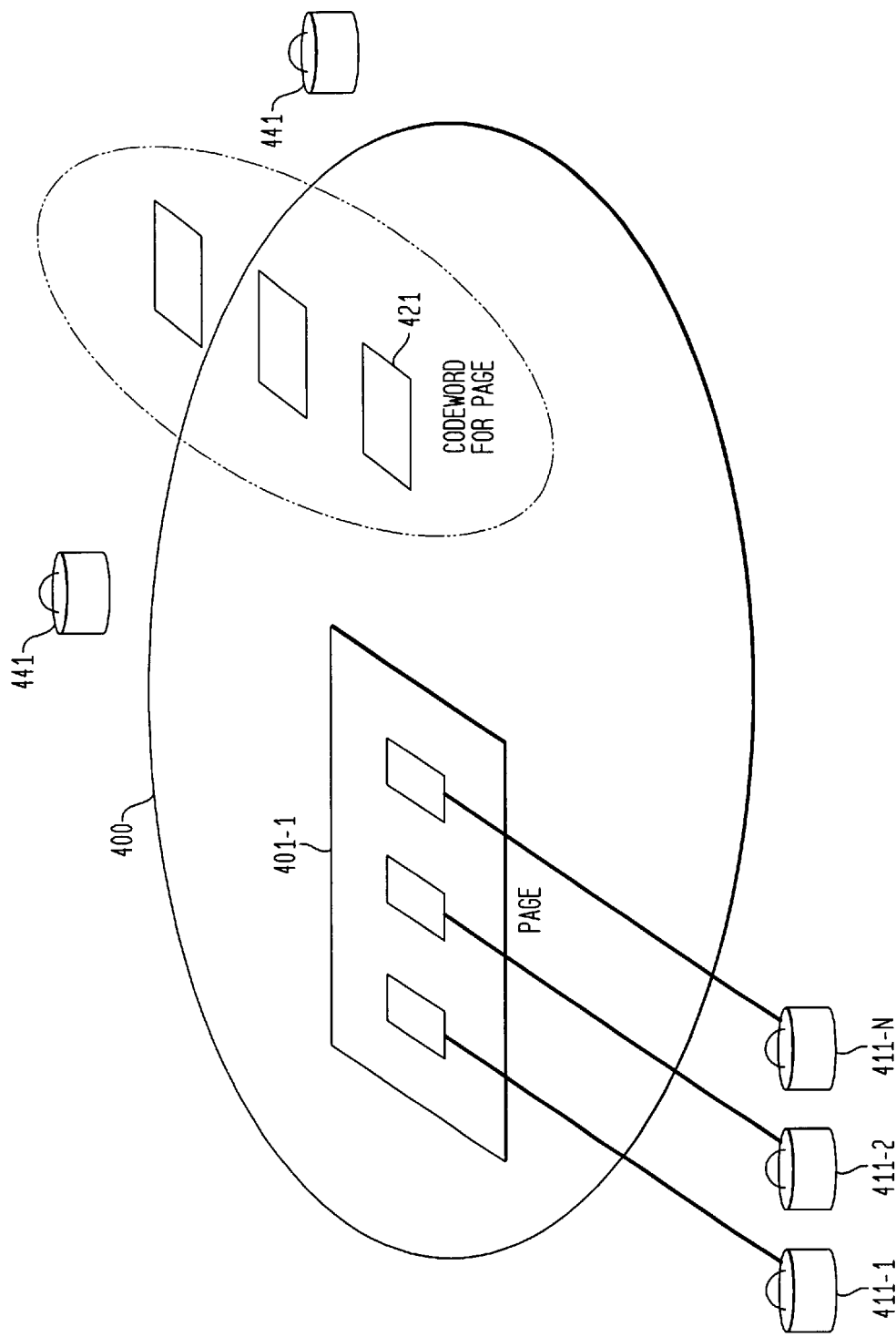
FIG. 4A also shows a database memory organized with codewords for page regions having a page portion protection latch permitting only one process to read or modify a codeword at a time useful in describing deferred codeword maintenance and FIG. 4B is useful in describing how deferred maintenance operates at log flush and associated recovery and audit processes.

We now describe an alternate scheme for physical error detection in which the maintenance of codewords is deferred to improve concurrency. This scheme stores codeword updates in log records and updates codewords, for example, during a log flush rather than during a data update (or immediately as described above). Updaters need not obtain any page latches, and checkpointing, codeword-auditing and page-flushing do not interfere with updates. FIG. 4A shows a database memory 400 organized with codewords 421 for page regions having a page portion protection latch 441a permitting only one process to read or modify a codeword at a time useful in describing deferred codeword maintenance. Since codeword updates are done during log flush, the system-log latch 441, which prevents concurrent flushes, serves to serialize access to the codewords. Read processes can go in at any time to read. Also, latch 441 allows several processes to modify a page concurrently, but only one process can go in to verify a page. Thus, the deferred maintenance scheme can result in increased throughput for update transactions, especially in main-memory databases, where the relative cost of latching can be substantial. Other locks/latches 411-1, 411-2 ... 411-N in the system control access to individual parts of the page 401-1.

For this scheme, each redo log record has an additional field, the "redo delta", which restores the value $\Delta(M)$, where M is the update denoted by the log record. Also, each undo record has a codeword-applied flag. We assume that the area covered by a redo log record does not span two or more protected regions; the assumption can be easily assured by splitting log records that span protection boundaries into multiple pieces.

The actions taken at various steps are described below and are in addition to the regular actions taken during these steps.

Begin Update: Add an undo log record for the update to the local undo log of the transaction that performed the update, and set codeword-applied in the undo log record to false.

End Update: Create a redo log record for the update. Find the undo log record for the update, and find the updated area from the undo log. Compute $\Delta(M)$ from the undo image in the undo log and the new value of the updated area, and store it in the redo $\Delta$ field in the redo log record. Add the redo log for the update to the redo log, and set the codeword-applied flag in the undo log record to true.

Undo Update: For each physical update in the undo log, a proxy redo log record is generated, whose redo image is the old value from the undo record. If the codeword-applied flag for the undo record is true, then a redo record has already been generated with $\Delta(M)$, so $\Delta(M^{-1})$ must be included in the proxy record to reverse the effect. $\Delta(M^{-1})$ is computed from the current contents of the region and the undo log record, and stored in the redo $\Delta$ of the proxy log record.

If the codeword-applied flag is false, then no redo log record has been generated, and thus no codeword delta will be applied by the flusher process. Since the codeword has not been changed and should not be changed, the proxy record is created as usual and 0 (a special value that results in no change to the codeword) is stored in its redo $\Delta$.

In either case, the physical undo log record is processed by replacing the image in the database with the undo image in the log. Note that the logical undo actions generate physical updates; codeword processing is done for these updates as described above.

Flush: When flushing a physical redo log record, the flusher applies redo $\Delta(M)$ from the log record to the codeword for that page. Note that the system log latch is held for the duration of the flush. Also, the variable end_of_stable_log is updated to reflect the amount of log which is known to have made it to disk.

Auditing

Figure 4B:
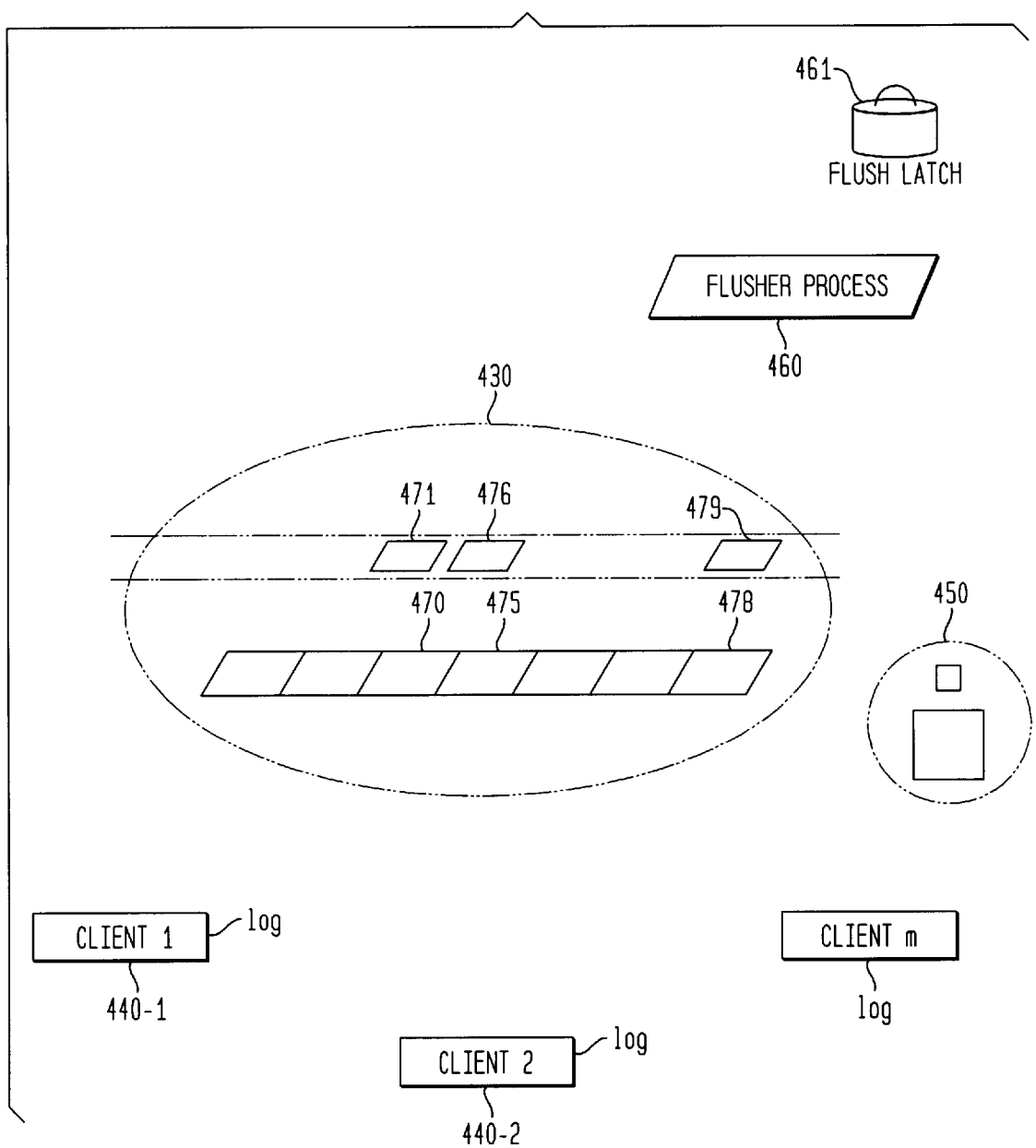

An algorithm for performing an audit under the deterred maintenance scheme will now be described with reference to FIGS. 4A and 4B. A database is shown in dashed line with some pages 470, 475, and 478 identified and their corresponding codewords 471, 476 and 479 of a codeword table 430. Clients attempt to read/write and maintain client personal logs 440-1, 440-2 and a log for client n not called out. A flusher process to disc is shown as flusher process 460 and a flush latch 461, A checkpoint image 450 is maintained for changes to pages of the database made by the clients.

In the logging-based scheme, while the updater's task is simpler, the job of the auditor has become significantly more difficult. When an auditor algorithm reads the page, it does so fuzzily, and partial updates may be captured. Log information must then be used to bring the page to an update-consistent state, so that it can be compared with a codeword value. This requires performing a small-scale version of the Dali recovery algorithm at checkpoint time. To avoid the expense of executing this algorithm for the entire database we introduce a fuzzy precheck. The idea of the precheck is simply to compute the codeword value of the page, ignoring ongoing updates, and compare that to the codeword value in the codeword table. If the two match, we assume that the page is correct. Note that this introduces a slightly increased risk of missing an error, because a valid, in-progress set of updates which have not made it to the table might exactly match the effect in the table of a corruption. However, we consider the probability of this to be approximately the same as the probability of an error going undetected by the codeword which is dependent on the codeword scheme, but is extremely small. We store the set of pages which fail this precheck test in the set AU_needed.

We now present the steps taken to audit the database:
1. For each page
   (a) Note the value in the codeword table 430 for the page, for example, page codeword value 471 for page 470 or codeword value 476 for page 475.
   (b) Compute its codeword (without latches or locks).
   (c) Note the value, for example, value 471, in the codeword table 430 for the page, for example, page 470, again.
   (d) If the computed value does not match either noted value, add the page, for example, page 470, to AU_needed.
2. Note end_of_stable_log into AU_begin.
3. Copy pages in AU_needed to the side, for example area 450.
4. Extract the trailing physical undo records for in-process transactions from the active transaction table ATT. Call this collection of physical records the AU_att. Records are gathered from different transactions independently, using a latch on the entry to ensure that operations are not committed by a transaction while we are gathering its log.
5. Get flush latch 461, and execute a flush to cause codewords from outstanding log records to be applied to the codeword table 430. Note the new end_of_stable_log in AU_end, Note the codeword values for all pages in AU_needed into a copy of the codeword table called AU_codewords. Finally, release the flush latch 461.
6. Scan the system log from AU_begin to AU_end. Physical redo records which apply to pages in AU_needed are applied to the side copy 450 of those pages. Also, if the undo corresponding to this physical redo is in the AU_att, it is removed.
7. All remaining physical undo records from AU_att which affect pages in AU_needed are applied to the checkpoint image 450.
8. Compute codewords of each page in AU_needed, and compare to the value in AU_codewords. If any differ, report that basic corruption has occurred on this page.

At the end of the flush in step 5, a certain set of updates for each page has been applied to the codeword table 430, and this is captured in AU_codewords. The purpose of the rest of the algorithm through step 7 is to ensure that the side copy of each page being checked contains exactly those updates. All prior updates which may have been partially or completely missing from the checkpoint image 450 are reapplied by step 7. Since in Dali redo log records are not immediately placed in the system log, some updates may have taken place which are only recorded in transaction's local redo and undo logs. Note that the codeword delta for these updates is not reflected in the codeword table 430. Therefore, these updates are undone in step 7, leaving the side image of a page consistent with the updates reflected in the codeword for the page in AU-codewords.

In this algorithm, individual transactions are blocked long enough to gather the outstanding physical undo records for the current operation.

Read Logging

In order to detect indirect physical and logical corruption, we introduce the idea of limited read logging. When a data item is read (the data item could be a tuple, an index node or any persistent data structure required for database consistency), a read log record identifying the start point and the length of the data that was read is written out. Of course, equivalent schemes may come to mind of one of ordinary skill in the art such as logging an end point and length of data read or other scheme. Since most writes are preceded by reads of the same data, one may assume that a write of a region is implicitly a read also, and thus significantly reduce the number of read log records required. Should an audit indicate that certain data is corrupt, the read log records can help determine if a transaction has in fact read the corrupt data. We shall see that the read log records provide a mechanism for tracing the flow of indirect corruption in the database and thus determining the set of transactions affected by an instance of direct corruption.

In database applications, a write log record is maintained of writes to a database. In a preferred embodiment of the present invention, the write log record is combined with the presently suggested read log record as a combined record. In an alternative embodiment, the read log record may be maintained separately from the write log record with a possible loss of efficiency in the recovery algorithms.

Optionally, a codeword for the data that was read can also be written out with the read log record. In the event of a crash, the codeword can be used to detect any corruption which may have occurred since the last audit, which would not otherwise be detected. The codeword is also used to detect when exactly an item was physically corrupted. given that a corruption has been detected by some other means (either an audit or by external means). For example, when an audit detects a corrupted protection region it must be assumed, in the absence of a codeword in the read log record, that any transaction reading the region since the time of the previous successful audit read the corrupted data. With the codeword, a precise check can be made.

Read Logging, unlike the other techniques presented so far, provides the benefits of being able to detect propagation of logical corruption. When read logging is used for this purpose, differences detected at the physical level may overestimate the flow of corruption. In this case, operations may log a checksum of the logical state found. How exactly to do so is dependent on the operation. However, the following property must be satisfied—if the checksums are the same (with a high probability) the two operation executions gave the same logical result. For example, an index lookup would log a checksum of the index entries that it retrieved, ignoring physical details such as location in the index.

There are two alternative ways of creating the read log record; the system designer must choose and use only one of them:
1) Physical read logs, which specify the start point and the length of the data that was read. Additionally the records can store a checksum of the data that was read, used during corruption recovery to detect reads of corrupted data.

2) Logical read logs, which use lock information for read logging. When a transaction locks a data item, a log record noting the lock information (name of the item and type of lock) is written out. This is done for both read and update locks, so that it is possible to detect which transaction has read information written by which other transaction. In the absence of write lock information, the physical redo log records alone may not be sufficient to infer which transactions read items written by a given transaction.

Generating Checkpoints Free of Corruption

Since Read Logging supports recovery from indirect corruption, it becomes crucial that the disk image be free not only of direct corruption, but indirect corruption as well, so that recovery does not require loading an archive image. Thus, when propagating dirty pages from memory to disk, it is not sufficient to audit the pages being written. Even if none of the dirty pages has direct physical corruption, it is possible that a "clean" page has direct corruption, and a transaction carried this corruption over to a page that was written out. Thus the checkpoint would have data that is indirectly corrupted.

With deferred maintenance of codewords or read logging, the correct way of ensuring that the checkpoint is free of corruption is to create the checkpoint, and after the checkpoint has been written out, audit every page in the database. If no page in the database has direct corruption, no indirect corruption could have occurred either. We can then certify the checkpoint free of corruption.

This technique cannot be directly applied to page flushes in a disk-based system, since it amounts to auditing all pages in the buffer cache before any write of a dirty page to disk (at page steal time). However, a similar strategy can be followed if a set of pages are copied to the side, and then an audit of all pages is performed before writing them to the database image on disk. To ensure that direct physical corruption does not escape undetected, a clean page which is being discarded to make room for a new page must also be audited.

Corruption Spread

Unlike prevention, the success of corruption detection and recovery is dependent on the rate at which corruption spreads and how quickly it is detected. The speed at which direct corruption is detected depends on the frequency of audits in the system, unless Read Prechecking is used, in which case the corruption may also be detected by a failed precheck. The rate of corruption spread may not be easily quantified, as it depends on two factors which are dependent on details of DBMS implementation and a particular application's use of the database.

First is the probability that an initial corrupt read will take place in a given time period. The second is the probability that a new transaction will read data corrupted indirectly by previous transactions. The probability of an initial corrupt read varies based on the application workload, internal DBMS implementation techniques, and which data is directly corrupted. Certainly, there is some data in any database that will corrupt almost any transaction that follows, for example, a key or pointer in the root node of a tree index. Similarly, there may be data that will cause no damage, such as currently free space, and data which will cause little damage, such as a text description which is not used in processing, just for display.

The second factor, the probability that a new transaction will read data which is already corrupted, depends on the frequency of contact between transactions, which again depends on the application and DBMS implementation. In addition, this probability will grow over time as more data is indirectly corrupted. Consider two variants of an application which updates customer information. In one variant, each transaction updates global summaries of the total business done with all customers, and in the other variant such global statistics are computed when they are needed, and individual transactions touch only one customer. Clearly, corruption would propagate extremely quickly in the first case, and much more slowly in the second.

In the worst case, any transaction would touch data written by a recent transaction. Any application in which each transaction both updates and uses a global statistic would exhibit this worst-case behavior. For example, a database which tracked the contents of a warehouse might have a summary of how much space is available, which would be checked for each incoming transaction before looking for space of the right size, etc. At the other extreme, transactions may deal with customer accounts with no overlap between customers (maintaining global statistics as in the previous example can lead to very poor concurrency). In this case, corruption would only spread outside of a particular customer record through DBMS structures, such as index nodes and free space lists. While corruption could still spread, the spread would be much slower.

In summary, the total amount of corruption allowed to arise in the database is determined by the speed at which the corruption spreads in a particular application/DBMS pair, and the frequency with which the data is audited.

CORRUPTION RECOVERY

So far we have seen how to detect direct physical corruption by means of codeword schemes, and to log information about reads to detect indirect physical and logical corruption. We now consider how to recover from corruption once it is detected. Note that these algorithms for recovery from corruption are tightly integrated with restart recovery. On detecting an error, we simply note the region or regions failing the audit, and cause the database to crash. Corruption recovery is handled as part of the subsequent restart recovery.

Cache Recovery Model

This algorithm is useful to recover from direct corruption when recovery from indirect corruption is not required. It is invoked when a precheck fails in the Read Prechecking scheme (as indirect corruption could not have occurred), or when an audit detects a codeword error in the Data Codeword scheme (as the Data Codeword scheme does not address indirect corruption). By ensuring that directly corrupted data does not get propagated to the disk image, recovery from a corrupted cache image can be accomplished with standard techniques. Such a technique is known for ARIES for use when a page is latched by a process which was unexpectedly terminated. For Dali, a similar technique can be used to reload the latest checkpoint and replay physical log records forward.

Prior-State Recovery Model

The prior-state model can be used to recover from any form of corruption, once the source of that corruption is determined, and the recovery can be accomplished with standard techniques. In this case, the techniques are similar to media failure. An archive image of the database must be loaded, and the log played forward to the latest point known to be prior to the introduction of corruption. Once that point is reached, the log is truncated, and restart recovery is executed (possibly generating additional log records).

Redo-Transaction Recovery Model

In order to recover from corruption under the redo-transaction model for corruption recovery, we require that a logical redo log is available along with the transaction code necessary to redo transactions. In particular, the logical log must be at the transaction level, that is the transaction's external inputs (e.g., from the user) are saved. In the following, we assume the transaction writes this logical description with its commit record.

We shall also require that the commit order be the same as the serialization order; this can be ensured by requiring that transactions hold all locks (or in multi-level recovery schemes, all locks at level n−1) till end of transaction.

Recovery

Corruption recovery begins as in the prior-state model—the database is recovered to a transaction consistent state known to be prior to the introduction of corruption. The tail of the log not used by this recovery is saved in OldLog before the log is truncated (see Section). The re-executed transactions will read non-corrupted data, and produce non-corrupted results.

When comparing transactions, we scan the logs in parallel; if we find that they both have operation begin log records indicating the operation has a logical checksum, and the checksums in the operation begin log records are the same, we stop comparing the checksums on the redo log records generated by the operations. When we reach the operation commit on both logs, we compare the logical checksum to see if the operation results were the same.

Handling External Writes and User Notifications

Changes in external writes have to be handled manually, and even changes to the database may require notification to the users in some cases. Identifying which transactions were corrupted enables humans to focus on these transactions, thereby reducing the human workload. Detecting what external writes changed as a result of re-execution simply requires external writes to be logged. The log comparison procedure above will then detect changes in external writes.

User Notification

Depending on the nature of the corruption, it may be helpful to determine which results exposed to the outside world were corrupt. To accomplish this, any transaction which reports to the user must log the values output to the user. During re-execution, these values can be checked against the values logged by the transaction as it re-executes. If they do not match, the user is notified.

Extension: Logical Corruption

The above algorithm can be easily extended to recover from logical corruption. This is accomplished by amending Old_Log, prior to recovery, in order to correct an erroneous transaction or transactions. For instance, we may have fixed errors in the transaction code, or we may use correct user inputs in place of wrong user inputs. We may even delete the transaction or replace it with one or more other transactions. If it is not known when the direct logical corruption occurred, techniques as described below can aid in making this determination.

Delete-Transaction Model

If a logical log is not available, recovery may take place under the delete-transaction model discussed above. For our delete-transaction model recovery algorithm, we need a checkpoint which is update-consistent in addition to being free from corruption. However, in Dali, a checkpoint being used for recovery is not necessarily update-consistent until recovery has completed (that is, physical changes may only be partially reflected in the checkpoint image, and certain updates may be present when earlier updates are not).

The Dali algorithm to obtain an update-consistent checkpoint uses a portion of the redo log and ATT to bring the checkpoint to a consistent state before the anchor is toggled and the checkpoint made active. Once performed, the checkpoint is update-consistent with a point in the log, CK_end.

We will outline how to get a checkpoint that is update consistent with a specific point CK_end in the redo log, by applying undo logs. Such a checkpoint has some important additional properties:

1) Effects of redo log records after CK_end are not reflected in the checkpoint image and
2) The checkpoint is codeword consistent as of CK_end.

As a result, when we replay log records after CK_end, whenever we encounter a read log record the database state will be exactly what the read found when the read log record was generated, unless the database was corrupted. That is, we can identify a point in the log such that all physical updates noted in the log up to the point are reflected in the checkpoint, and none of the physical updates in the log after that point are reflected.

Such a checkpoint can be obtained by a simple modification of the Dali checkpointing scheme. We create a checkpoint exactly as done in Dali, but then perform some physical redos and undos on the checkpoint image as described below, to make it update-consistent.

Recovery Algorithm

The main idea of the following scheme is that corruption is removed from the database by refusing during recovery to perform writes which could have been influenced by corrupt data. In order to do this, the transactions which performed those writes must, at the end of the recovery, appear to have aborted instead of committed. Certain other transactions may also be removed from history (by refusing to perform their writes) in order to ensure that these "corrupt" transactions can be effectively removed, and thus ensuring the final history as executed by the recovery algorithm is delete-consistent with the original execution as discussed above.

Figure 5A:
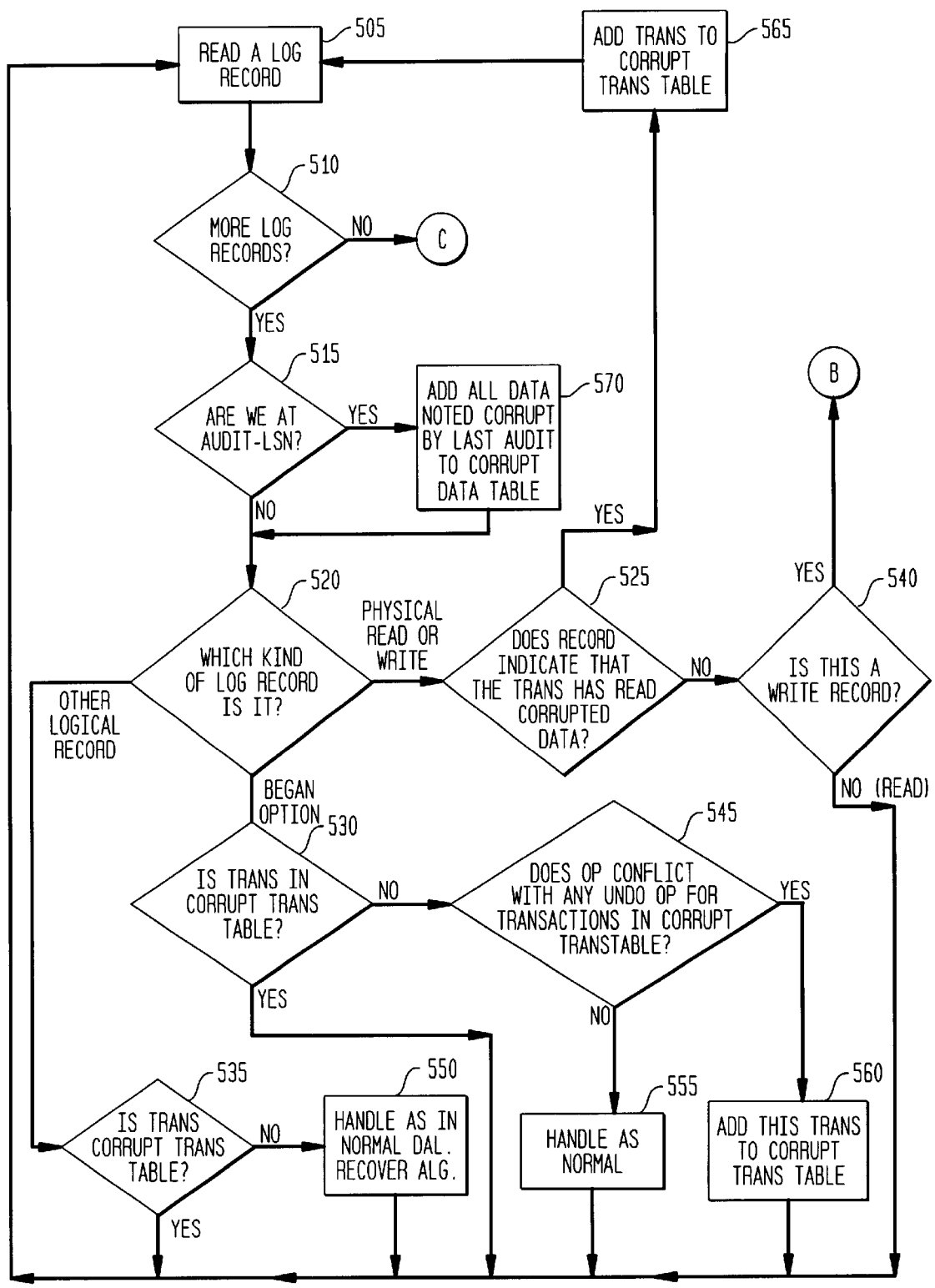
FIGS. 5A and 5B together comprise a flowchart of a recovery algorithm for the delete transaction model of the present invention comprising a redo phase followed by an undo phase before checkpointing the database.
Figure 5B:
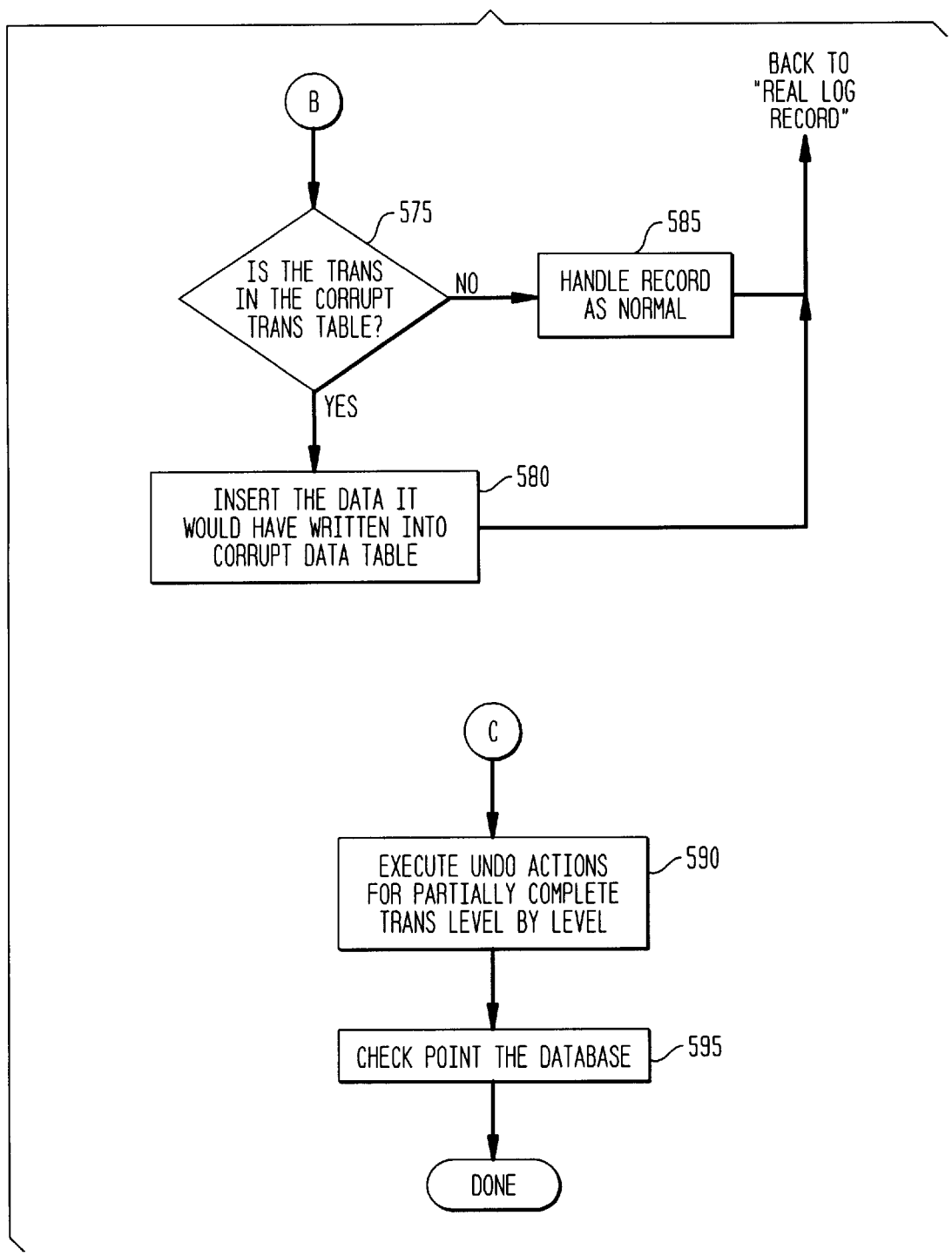

Recovery must start from a database image that is known to be non-corrupt. Note that since errors are only detected during checkpointing or auditing, we may not know exactly when the error occurred; the error may have been propagated through several transactions before being detected. FIGS. 5A and 5B comprise a flowchart of the recovery algorithm for the delete transaction model. The starting point of the algorithm is box 505. The algorithm conservatively assumes that the error occurred immediately after Audit_LSN, the point in the log at which the last clean audit began. Box 505 relates to the repetitive process of reading log records and box 515 asks whether we are at Audit_LSN. If yes, then, we add all data noted as corrupt by the last audit to the CorruptDataTable. If not, we enter a redo phase followed by an undo phase.

Two tables, a CorruptTransTable and a CorruptDataTable are maintained. A transaction is said to have read corrupt data if the data noted in a read or write log record of that transaction is in the CorruptDataTable.

Restart recovery consists of the redo phase followed by the undo phase. The redo phase initiates with the question what kind of log record is it at box 520.

Redo Phase:

The checkpointed database is loaded into memory and the redo phase of the Dali recovery algorithm is initiated, starting the forward log scan from CK_end.

During the forward scan, the following steps are taken (any log record types not mentioned below are handled as during normal recovery):

If a read log record or a physical write log record is found, you follow the path in FIG. 5A to box 525, and if this record indicates that the transaction has read corrupted data at box 525, then the transaction is added to CorruptTransTable (where it may already appear) at box 565.

If a log record for a physical write is found, then there are two cases to consider:
1. The transaction that generated the log record is not in CorruptTransTable at box 575: In this case, the redo is applied to the database image as in the Dali recovery algorithm at box 585.
2. The transaction that generated the log record is in the CorruptTransTable (CTT): In this case at box 580, the data it would have written is inserted into CorruptDataTable (CDT). However, the data is not updated because the transaction is in the CTT.

If a begin operation log record is found for a transaction that is not in CorruptTransTable at box 530, then it is checked against the operations in the undo logs of all transactions currently in CorruptTransTable. If it conflicts with one of these operations, then the transaction is added to CorruptTransTable at box 560. This ensures that the earlier corrupt transaction can be rolled back. If it does not conflict, then it is handled as in the normal restart recovery algorithm at box 555.

If a logical record such as commit operation, commit transaction or abort transaction is found, the record is ignored at box 535 if the transaction that generated the log record is in CorruptTransTable. Otherwise, the record is handled as in normal restart recovery at box 550.

When Audit_LSN is passed at box 515, all data noted to be corrupt by the last audit or by analysis of a logical error, is added to CorruptDataTable at box 570.

Undo Phase:

At the end of the forward scan, incomplete transactions are rolled back. following the normal Dali restart recovery algorithms undo phase. As in the normal Dali algorithm, undo of all incomplete transactions is performed logically level by level. Note that at the end of the redo phase, each transaction in CorruptTransTable has a (possibly empty) undo log. This log records the actions taken by the transaction before it first read corrupted data. During the undo phase at box 590, these portions of the corrupt transactions are being undone along with the transactions which were in progress at the time of the crash.

Checkpoint:

The extended restart recovery algorithm is completed by performing a checkpoint at box 595 to ensure that recovery following any further crashes will find a clean database free of corruption, and to avoid the insertion of records into the log during the rollback of a corrupt transaction. If the checkpoint were not performed, a future recovery may rediscover the same corruption and in fact additionally declare transactions that started after this recovery phase to also be corrupted. Note that this checkpoint invalidates all archives. The log may be amended during recovery to avoid this problem.

Discussion

The database image at the end of the above algorithm should reflect a delete history that is consistent Cm this case, conflict-consistent) with the original transaction history. To see (informally) that this is the case, first observe that all top-level reads of non-deleted transactions read the same value in the history played during recovery as in the original history. This is because any data that could possibly have been read with different values was previously placed in CorruptDataTable, and top-level reads must be implemented in terms of physical-level reads where corruption is tracked. The second observation is that the database image is consistent and contains the original contents plus the writes of those transactions which do not appear in the delete set. This follows from the correctness of the original recovery algorithm, and the fact that the initial portion of corrupted transactions can be rolled back during the undo phase along with normal incomplete transactions to produce a consistent image. This is ensured since we do not allow any subsequent operations which conflict with these operations to begin.

Extension: Codewords in Read Log Records

If codewords are stored in read log records, then detection of indirect corruption becomes more precise. In particular, the CorruptDataTable can be dispensed with, and instead, the definition of reading corrupt data given above is replaced by the following two cases:
1. A codeword is stored in a read log record, and it does not match the computed codeword for the corresponding region in the database being recovered.
2. A codeword is stored in a write log record (indicating that it should be treated as a read followed by a write) and the codeword does not match the computed codeword for the corresponding region in the database.

A second benefit of storing codewords in read log records is that it is possible to detect physical corruption which occurred after the last audit but before the crash. More precisely, physically corrupt data will be detected if any transaction read it, since during recovery the codeword for these transactions will not match the database image being recovered. Thus, if codewords are present, the corruption recovery algorithm should be executed not only when an error is detected, but also on every restart.

Note that the modified algorithm produces a recovery schedule which is view-consistent with the original history, thus not propagating corruption when the corrupt transaction wrote the same data to a data item as it would have had in the delete-history. However, these benefits must be traded against a slight degradation in performance (see performance section below for details).

Extension: Recovering from Logical Corruption

The algorithm given above can be easily adapted to recover from logical corruption. This corruption may have occurred before the last checkpoint, thus an archive image that was taken prior to the introduction of the error is restored, and CK_end (the point at which recovery starts) taken from that archive. Audit_LSN is defined to be the latest point in the log such that the corruption is known to have occurred after that point. If this point is not known, backwards analysis techniques discussed below can be used to help locate it. Finally, when the point Audit_LSN is passed during recovery, any data which was directly affected by the corrupting error must be added to CorruptDataTable.

LOGICAL CORRUPTION

Approaches to recovering from logical corruption have already been given in the context of the redo-transaction and delete-transaction models. In this section, we discuss some issues involved in determining when logical corruption was introduced, and outline an efficient variant of the redo-transaction recovery scheme for a restricted recovery model.

The techniques described so far do not consider transactions with faulty code that updated the database erroneously, but through the prescribed interface. Similarly, transactions that were executed incorrectly, for instance with wrong user input, have not been considered so far herein. We call transactions such as the above as erroneous transactions. Of course, it is not possible to prevent erroneous transactions, since users as well as programmers can always make mistakes.

Detecting that there has been an erroneous transaction execution is quite non-trivial, and cannot be done automatically by the system, since the differences between good and erroneous transaction executions are at a semantic level above what the database may be aware of. Integrity constraints may help detect some such errors, but cannot detect all.

We assume that humans have somehow become aware that an error has occurred. For instance, a customer may complain of a wrong balance, or an operator may discover that a transaction he ran yesterday ought not to have been executed.

We have two models of error detection here: where it is known exactly which transaction originally caused the error, or which was the first erroneous transaction. In this case, only forward recovery is required. For example, the case where the operator realizes a transaction he ran ought not to have been executed.

Once the cause of the error is known, we can find the latest consistent checkpoint (archive image) prior to executing the erroneous transaction, and perform recovery using one of the algorithms given in our corruption recovery section.

If recovering under the redo-transaction model, however, we do not simply re-execute erroneous transactions, but re-execute a corrected version of the transaction. For instance we may have fixed errors in the transaction code, or we may use correct user inputs in place of wrong user inputs. We may even delete the transaction or replace it with one or more other transactions.

Backward Analysis—Determining the Source of Corruption

Even if it is known that logical corruption has occurred, it may not be known which transaction initially introduced the error. For example, a customer has detected a wrong balance but does not know what caused it. Here, two steps are required: detecting the root cause, and then forward recovery from there.

The database system cannot automatically detect the root cause, but can provide support to humans to detect the problem by supporting backward analysis of the log using the read log records.

The following algorithm is applicable when certain data are known to be corrupt, and the source (originating transaction) for the corruption is sought. This algorithm assumes that the database log has been enhanced with logs of data. items read using the read logging techniques described earlier. The database log contains a record of both writes and reads, and each write is assumed to imply a prior read of the item. The idea is to trace backward through the log, tracking how corruption could have flowed into the known-corrupt data items.

Assume there are n data items known to be corrupt. Let SuspectData be a set of data suspected of being corrupt. Associate with. each suspect data item, D, in SuspectData a set of integers from 1. . . n, A(D) which represents the known-corrupt data which could have been affected by corruption if D itself were found to be corrupt. Let Suspect-Trans be a set of suspect transactions, each with a set A(T) associated with semantics analogous to A(D): if i is in A(T), then if transaction T has read corrupt data or was itself the source of direct logical corruption, then the known corruption of data item i could be explained as resulting from this error. The goal is to find a single transaction which could explain all the known corruption, that is all the items 1. . . n are in the set A(T) for that transaction.

In our algorithm, we would process the log backwards; that is, for each log record, do:
 If the log record is a write of data item D by transaction T and if D is in SuspectData, add T to SuspectTrans (if not already present), and set A(T) equal to $\Delta(D) \cup A(T)$.
 If the log record is a read of data item D by transaction T and if T is in SuspectTrans, add D to SuspectData (if not already present) and set A(D) to be $A(D) \cup A(T)$.
 If any A(T) contains all elements from 1. . . n, offer transaction T to the user as a possible root cause of the corruption. If the user accepts, done, else continue.

Now we will discuss an example where the corruption detection and recovery algorithms of the present invention may be applied to advantage. Consider an example where five customers of a bank, Bank A, call over the course of a day and complain that their balance is incorrect. A corruption detection algorithm according to the present invention will proceed by processing the log backwards from the latest time when a bad balance is reported. It may soon be found that a transaction which added interest to accounts had recently updated all five accounts. This transaction has an associated set, A(T), which contains all five known corrupt data items, and the transaction will be presented to a user of the system as a potential source of corruption. The user upon examining the transaction may determine, however, that the interest rate was computed correctly, and thus prompt the algorithm to continue searching for an explanation for the corruption.

Subsequently, it may be found that earlier in the log of events, updates to the third and fifth complaining customers' balances had been made due to an ATM (automatic teller machine) withdrawal at Bank B. Since the transaction that posted these withdrawals would read the main data record for Bank B, that record would be added to the SuspectData set. If subsequently in processing (earlier in time) it is discovered that the other complaining customers' accounts had been subject to withdrawals from ATM's owned by the same Bank B, which also read the main data record for Bank B, then the A(D) associated with the main data record for Bank B (D), would contain all known corrupt data items. The next (earlier) transaction to update the main data record for Bank B would be presented to the user as a potential source of corruption. In this example, it may turn out that the amount of money charged by Bank B as an overhead for using their ATM had been incorrectly entered into the database, resulting in the eventual incorrect balances. A user may use any one of the corruption recovery algorithms described herein to help determine which other customers are affected by this incorrect update, as well as other data items which may be affected indirectly such as payments of these charges to Bank B.

As written the detection algorithm assumes that all the known corruption originated from a single source. However, the algorithm can be easily modified to consider multiple sources of corruption. For example, it could present to the user whenever two transactions together explained all the corruption, that is the union of A(T) and A(T1) contained all the data elements 1. . . n, where T and T1 are two transaction in SuspectTrans table.

Optimizing Recovery in the Redo-Transaction Model

Unfortunately, under the redo-transaction model of corruption recovery, the logical re-execution of a transaction may take time similar to its original execution; if an error is discovered after several days, it can reasonably be expected to take several days to recover the database. During this time the database would be unavailable.

Referring to FIG. 6, we now outline an alternative approach to implementing the redo-transaction model which assumes a two-level recovery model with logical or physiological redo logging. Thus, record-level operations are logged, record-level locks are held for the duration of the transaction, and latches are held on pages for the duration of an operation. The goal of the algorithm is to use primarily the log for recovery, only re-executing a select few transactions.

In the algorithm given below, we may use a CorruptDataTable as in the delete-transaction model recovery algorithm, or use logical read logging as described in above. A transaction is said to read corrupted data if It reads data in the CorruptDataTable, if such a table is used.

The logical codeword is computed for an operation during recovery, and it does not match a codeword recorded in the log.

In addition to the actions normally taken during recovery, the corruption recovery algorithm proceeds by processing records as follows:

Save log records per step 601 for a transaction until a commit or an abort for the transaction is seen.

If the commit log record for a transaction is encountered via path 605, then
1) The read log records for the transaction are scanned at step 610 to determine if the transaction has read corrupted data. If so, the transaction is marked as corrupt at step 615.
2) If the transaction is marked as corrupt, it is re-executed logically, and the new logical redo records are used to replace its redo records in the log at step 620. Any data which the original transaction wrote, or was written during the re-execution, is added to the CorruptDataTable, if one is used.
3) If the transaction is not marked as corrupt, its log records are executed at step 625.
4) If an abort record for a transaction is found at step 630, the log records for that transaction are discarded at step 635.

Since the redo records are logical and record-level locks are held to the end of transaction, executing the log records at the point where the commit record appears is correct. Note that when a transaction is re-executed, it could generate different log records. In fact, the operations it performs may be completely different from the ones it originally performed. Since transactions are executed at their commit point, this new transaction will serialize with respect to other transactions which might have originally executed concurrently with it. It will read the data as written by any transaction which serialized before it, and if its actions cause any new conflicts with transactions that serialize after it, these transactions will read corrupt data and be re-executed themselves.

PERFORMANCE

The goal of our performance study was to compare the relative cost of different levels of protection, for example detection versus prevention, as well as comparing different techniques for obtaining the same level of protection. In each case, we are interested in the impact of the scheme on normal processing as opposed to the time taken for recovery. Corruption recovery is expected to be relatively rare, and the time required is highly dependent on the application and workload. The algorithms studied were implemented in the DataBlitz Storage Manager, a storage manager being developed at Bell Labs based on the Dali main memory storage manager.

Performance of mprotect

Before describing the comparison of schemes, we begin by looking at the relative performance of memory protection primitives on commonly available UNIX hardware. In the Table below, we evaluate the basic performance of the memory protection feature on a number of hardware platforms locally available to us. In each case, 2000 pages were protected and then unprotected, and this was repeated 50 times. The number reported is the average number of these pairs of operations which were accomplished per second.

As shown in this table, the UltraSPARC on which our benchmarks were run is significantly faster at memory protection than the other UNIX platforms to which we had access, leading us to expect that hardware protection may fare worse on other platforms.

| Platform | pairs/second |
| --- | --- |
| SPARCstation 20 | 15,600 |
| UltraSPARC2 | 43,000 |
| HP 9000 C110 | 3,300 |
| SGI Challenge DM | 8,200 |

Performance of Protect/Unprotect
Implementing Read Logging and Prechecking

Computation of codeword values for reads takes place in two contexts: as part of a codeword precheck or when computing the codeword to be stored in a read log record. In general, implementation difficulty must be traded against the window of potentially undetected corruption. To minimize the window for undetected corruption, a codeword computation should be made after the read has occurred. If the computation is made before the read, direct corruption could take place in the window between the computation of the codeword and the read itself.

In the case of prechecking, if a read is performed, and a write is made based on that read before the codeword for the read is checked, then this write can potentially cause transaction-carried corruption, which the Read Prechecking scheme is designed to prevent. More precisely, such a write can be allowed, but cannot be visible to another transaction, and it must be possible to undo the write physically, as any logical undo based on a corrupt read cannot be trusted.

For example, in a page-based system, one approach is to perform the read precheck when a page is Fix'ed in a shared mode, which leaves some window between the computation and the read in which undetected corruption could occur. Alternatively, the precheck can occur at UnFix time, introducing the possibility that a write is issued which is based on the Fix'ed data before the UnFix takes place, in which case provision must be made to physically undo that write if an error is detected at UnFix time.

For read logging, the read logrecord must appear in the log before any subsequent writes so that the recovery algorithms will consider the writes as suspect. In this case, it is simpler to use the codeword at Fix time.

A conservative solution, which may have a significant performance cost, is to copy the information to be read into private space and perform the test and subsequent reads on this copy. In the page-based example, this would happen at Fix time.

To eliminate any window between checking the codeword for some data and then using it, an explicit call to perform the check must be inserted between reads and any writes which are possibly exposed to another transaction. For example, if pages are fixed in read mode for the duration of a complicated action, then some analysis of the code will be required to add the additional calls.

In our implementation, which is not page based, we assumed that any write was also a read, thus the codeword was checked during beginupdate calls. We added calls before all reads of persistent data which were not part of a write. In the case in which a codeword is included with the read log record, then these codewords were added to the write log record as well as being added to the read log record. Thus, calls for each read which was not part of a write were added to the portions of the code which is used by our performance tests, including the allocation code, the relation manager, and one index structure, a hash table.

Workload

The workload examined is a single process executing TPC-B style transactions. The database consists of four tables, Branch, Teller, Account, and History, each with 100 bytes per record. Our database contained 100,000 accounts, with 10,000 tellers and 1,000 branches. These ratios are higher than in TPC-B, in order to limit CPU caching effects on the smaller tables. The benchmarks were run on an UltraSPARC with two 200 MHZ processors, and 1 gigabyte of memory. All tables are in memory during each run, with logging and checkpointing ensuring recoverability. In each run, 50,000 operations were done, where an operation consists of updating the (non-key) balance fields of one account, teller and branch, and adding a record to the history table. Transactions were committed after 500 operations, so that commit times do not dominate. The alternative was to design a highly concurrent test with group commits, introducing a great deal of complexity and variability into the test. Each test was run six times, and the results averaged. The results are reported in terms of number of operations completed per second.

Prechecking and Protection Domain Size

The table below provides operations per second and percent slower for page sizes from 64 bytes to 8k bytes.

| Size | Ops/Sec | % Slower |
|---|---|---|
| None | 417 | 0% |
| 64 | 366 | 12.2% |
| 128 | 348 | 16.5% |
| 256 | 329 | 21.1% |
| 512 | 311 | 25.4% |
| 1024 | 277 | 33.5% |
| 8192 | 115 | 72.4% |

Precheck Domain Sizes

Before presenting general results, we discuss a tradeoff in the implementation of the Read Prechecking algorithm. The Read Prechecking algorithm verifies each read by computing the codeword of the regions which the read intersects. Since one codeword is stored for each protection domain, the size of the region leads to a time-space tradeoff for this scheme. We present the performance of Read Prechecking with Data Codeword maintenance for a variety of sizes of protection domains from 64 bytes to the 8K page size of our machine. With small size protection domains, this scheme performs well, but may add 3%–6% to the space usage of the database. The scheme breaks even with hardware protection at about 1K protection domains. These results are shown in the above precheck Table.

Results

The table below provides our results in terms of cost of corruption protection for the various algorithms discussed herein:

| Algorithm | Physical Corruption Direct | Physical Corruption Indirect | Logical Corruption Indirect | Ops/Sec | % Slower |
|---|---|---|---|---|---|
| Baseline | None | None | None | 417 | 0% |
| Data Code-Word (CW) | Correct | None | Nothing | 380 | 8.5% |
| Data CW w/ Precheck, 64 byte | Correct | Prevent | Nothing | 366 | 12.2% |
| Data CW w/ ReadLog | Correct | Correct | Correct | 345 | 17.1% |
| Data CW w/ CW ReadLog | Correct | Correct | Correct | 323 | 22.4% |
| Data CW w/ Precheck, 512 byte | Correct | Prevent | Nothing | 311 | 25.4% |
| Memory Protection | Prevent | Unneeded | Nothing | 257 | 38.2% |
| Data CW w/ Precheck, 8K byte | Correct | Prevent | Nothing | 115 | 72.4% |

In the above Cost of Protection Table, a representative selection of the algorithms discussed in this paper are shown, along with the average number of operations per second the algorithm achieved in our tests, and the relative slowdown of the algorithm compared to the baseline algorithm, which is just the system running with no corruption protection. Our experiments show that detection of direct corruption can be achieved very cheaply, with about 8% cost, with simple data codeword protection. The choice between these algorithms can be made on ease of implementation in a particular system. Prechecking with a small domain size is economical at a 12% cost, depending on the acceptability of a 6% space overhead. Read logging lowers the space overhead, but raises the cost to 17%, which is significant, but may be worthwhile, since automatic support for repairing the database can then be employed, and the results of erroneous transactions can be tracked. Logging the checksum of the data read, which increases the accuracy of the corruption recovery algorithms, adds 5% to the cost, bringing it to 22%. Memory protection using the standard mprotect call costs 38%, more than double the performance hit of codeword protection with read logging. Finally, prechecking with large domain sizes fares very poorly.

Our conclusion from these results is that some form of codeword protection should be implemented in any DBMS in which application code has direct access to database data. Detection of direct corruption is quite cheap, and as limited as it is, is still far better than allowing corruption to remain undetected in the database. Other levels of protection may be implemented or offered to users so that they may make their own safety/performance tradeoff.

Thus there has been described a variety of schemes for preventing or detecting physical corruption using codewords, and for tracing and recovering from physical and logical corruption using read logging. Finally, a performance study comparing alternative techniques of corruption detection and recovery demonstrated the utility and practicality of the present invention involving codewording and read logging. Protection from direct physical corruption is economical to implement, transaction-carried corruption can be prevented cheaply if enough space is available for small protection domains, and detection of transaction carried corruption for later correction through read logging imposes about a 17% cost on update transaction performance. The technique of the present invention opens up interesting possibilities in tracing logical errors through the database system and aiding in their correction. The new schemes are shown to be significantly cheaper than using the memory protection and unprotection provided by UNIX around every update.

Our techniques may deal with logical corruption and handle errors which are not caught by integrity constraints. Our techniques for handling physical corruption will be of increasing importance since applications are increasingly being provided direct access to persistent data. Since limited protection is very cheap, we believe implementors of database systems in which application code has direct access to database buffers should provide some form of protection, at least as an option for users. Our techniques have been shown to be highly portable, and use only simple integer operations which will be efficient on all modem processors.

In summary, then, the present invention may find application in the efficient recovery from physical or logical corruption, off-line generation of consistent checkpoints to be used to check global integrity constraints, fault-induction tests of logical corruption recovery, and implementation of these techniques in other database management systems. The present invention may be implemented in a real-time environment, for example, a communications environment where the busy state of communications channels, circuits and the like are preserved in a central (at a switch or server) or distributed database management system. All patent applications and articles referenced herein should be deemed to be incorporated by reference as to their entire contents. The present invention should only be deemed to be limited in scope by the claims which follow.

What we claim is:

1. A method of detecting and recovering from data corruption of a database comprising the steps of logging information about reads of a database to automatically detect and recover from physical corruption of the data in the database using a codeword matching audit algorithm said information about reads comprises one of a start and an end point and length of data read for detection of said physical corruption arising from bad writes of data to the database or corruption arising indirectly therefrom, and maintaining a corrupt transaction table and a corrupt data table for a recovery algorithm.

2. A method of detecting and recovering from data corruption as recited in claim 1 further comprising the step of:
    storing data of the database in main volatile memory of a data processor.

3. A method of detecting and recovering from data corruption as recited in claim 1 further comprising the steps of:
    maintaining a log of writes of the database and combining said log of reads and said log of writes into a combined log of reads and writes.

4. A method of detecting and recovering from data corruption as recited in claim 3 further comprising the step of storing a codeword corresponding to a value of a data item in a record of said combined log of reads and writes.

5. A method of detecting and recovering from data corruption as recited in claim 3, said recovery from data corruption comprising first and second phases, a first redo phase followed by an undo phase.

6. A method as recited in claim 5 wherein said redo phase comprises a forward scan of a log of read and write operations.

7. A method as recited in claim 6 wherein said forward scan adds an identity of data to a corrupt data table whenever said data is written by a corrupt transaction.

8. A method as recited in claim 6 wherein said forward scan adds an identity of data to a corrupt data table whenever said data has failed an audit.

9. A method as recited in claim 6 further comprising the step of maintaining a corrupt transaction table.

10. A method as recited in claim 9 wherein said forward scan adds transactions to said corrupt transaction table that are known corrupt transactions.

11. A method as recited in claim 9 wherein said forward scan adds transactions to said corrupt transaction table whenever data is read that is identified in the corrupt data table.

12. A method as recited in claim 11 wherein in a redo phase, actions such as writes are applied to a database image unless a transaction is listed in the corrupt transaction table.

13. A method as recited in claim 9 further comprising the step of storing a codeword corresponding to a value of a data item in a record of said combined log of reads and writes wherein said forward scan adds transactions to said corrupt transaction table whenever said codeword does not match the current value of said data item read from a database.

14. A method as recited in claim 6 wherein said undo phase comprises undoing portions of corrupt transactions.

15. A method as recited in claim 6 wherein said undo phase comprises undoing in progress corrupt transactions at the time of a data processor failure.

16. A method of detecting and recovering from data corruption as recited in claim 3 further comprising the step of responsive to the identity of a known corrupt data item, determining a probable source of the corruption from said combined log of writes and reads.

17. A method as recited in claim 16 wherein said determining step comprises the substep of processing said log of writes and reads backwards from an end of said combined log of writes and reads.

18. A method as recited in claim 17 further comprising the substeps of maintaining a table of suspect corrupt data items and, for each data item of said table, maintaining a set of known corrupt data items whose corruption would be explained if said data item were corrupt.

19. A method as recited in claim 18 further comprising the substep of maintaining a table of suspect corrupt transactions and, for each transaction of said table, maintaining said set of known corrupt data items whose corruption would be explained if said transaction were corrupt.

20. A method as recited in claim 19 further comprising the substeps of adding a transaction to the table of suspect corrupt transactions when a write of a data item in the suspect data table by said transaction is encountered in said combined log during said backwards processing step.

21. A method as recited in claim 20 further comprising the substep of adding the set of known corrupt data items associated with said data item in the suspect data table to the set of known corrupt data items associated with said transaction.

22. A method as recited in claim 19 further comprising the substep of adding a data item to the suspect data table when a read of said data item by a transaction in the suspect transaction table is encountered in said combined log during said backwards processing step.

23. A method as recited in claim 22 further comprising the substep of adding the set of known corrupt data items associated with said transaction to the set of known corrupt data items associated with said data item.

24. A method as recited in claim 23 further comprising the step of stopping said backwards processing whenever a suspect transaction exists in the suspect transaction table such that the set of data items associated with said transaction contains all known corrupt data items, said transaction being output to said user as a possible source of said corruption.

25. A method as recited in claim 24 further comprising the steps of performing forward recovery from said transaction determined by said user as a source of said corruption.

26. A method of detecting and recovering from data corruption as recited in claim 1 further comprising the step of logging one of an identity of information read from and an identity of information written to the database.

27. A method of detecting and recovering from data corruption as recited in claim 1 further comprising the step of:
storing a codeword in a record of said read-logging information.

28. A method of detecting and recovering from data corruption as recited in claim 1 further comprising the step of:
protecting data of the database with codewords, one codeword for each region of the database.

29. A method as recited in claim 1 wherein in a delete transaction model comprises deleting effects of selective transactions from a database image when the transaction was affected by an error.

30. A method as recited in claim 1 for further recovering from logical corruption, the method comprising the step of maintaining a logical redo log.

31. A method as recited in claim 30 further comprising the additional steps of maintaining a transaction code for redoing transactions and of storing user inputs for a transaction in said logical redo log.

32. A method as recited in claim 31 further comprising the step of maintaining a commit record at a transaction level.

33. A method as recited in claim 30 comprising the further step of returning a database to a transaction consistent state prior to a first detected instance of possible data corruption.

34. A method as recited in claim 33 comprising the further step of rerunning transactions affected by the first detected instance of a possible data corruption in the same order as an original set of transactions.

35. A method as recited in claim 33 comprising the further step of deleting effects of transactions when logical information is unavailable to permit redoing transactions.

36. A method as recited in claim 1, wherein direct physical corruption has occurred to data in memory used for database cache, further comprising the step of removing corruption from cache pages without reflecting any corrupt data values in log records.

37. A method as recited in claim 1 wherein said information about reads comprises one of a start and an end point and length of data read.

38. A method as recited in claim 1 further comprising the step of detecting logical corruption of data, said method comprises the step of logging a codeword of a logical state found.

39. A method as recited in claim 1, further comprising the step of logging lock information in a logical read log.

40. A method as recited in claim 39 wherein said lock information comprises a name of a data item and a type of lock.

41. A method as recited in claim 1 further comprising the step of ensuring a disc image of said database is free of corruption.

42. A method as recited in claim 1, wherein, in the event of logical corruption, said method comprises the step of logging the identity and codeword for a logical structure protected by a lock.

43. A method of detecting and recovering from data corruption of a database comprising the steps of logging information about reads of a database to automatically detect and recover from logical corruption of the data in the database using a codeword matching audit algorithm for detection of said logical corruption, maintaining a logical redo log and storing user inputs for a transaction in said logical redo log, and maintaining a corrupt transaction table and a corrupt data table for a recovery algorithm.

44. A data corruption recovery method as recited in claim 43 further comprising the step of performing forward recovery in said logical redo log from a determined point of initial corruption.

45. A corruption recovery method as recited in claim 44 further comprising the steps of saving log records until a commit or an abort for a transaction is seen and, if a commit is seen, then scanning the read log records to determine if a transaction has read corrupted data and marking the transaction as corrupt.

46. A corruption recovery method as recited in claim 45 further comprising the steps of, if a commit is seen and the transaction is marked corrupt, reexecuting the transaction logically and, responsive thereto, replacing logical redo records with redo records generated by the logical reexecution of the transaction and adding data written by the transaction to a corrupt data table.

47. A corruption recovery method as recited in claim 45 further comprising the steps of, if a commit is seen and the transaction is: not marked corrupt, executing its logical redo records.

48. A corruption recovery method as recited in claim 44 further comprising the steps of saving log records until a commit or an abort for a transaction is seen and, if an abort is seen, discarding the log records.

49. A method of detecting and recovering from data corruption of a database comprising the steps of logging information about reads of a database to automatically detect and recover from logical corruption of the data in the database using a codeword matching audit algorithm for detection of said logical corruption, maintaining a corrupt transaction table and a corrupt data table for a recovery algorithm and deleting the effects of transactions from an image of the database.

50. The method of detecting and recovering from data corruption as recited in claim 49 further comprising the step of logging lock information in said logical redo log.

51. A method of detecting and recovering from data corruption as recited in claim 49, said recovery from data corruption comprising first and second phases, a first redo phase followed by an undo phase.

52. A method as recited in claim 51 wherein said redo phase comprises a forward scan of a log of read and write operations.

53. A method as recited in claim 52 wherein said forward scan adds an identity of data to a corrupt data table whenever said data is written by a corrupt transaction.

54. A method as recited in claim 52 wherein said forward scan adds-transactions to a corrupt transaction table whenever data is read that is identified in the corrupt data table.

55. A method as recited in claim 54 wherein in a redo phase, actions such as writes are applied to a database image unless a transaction is listed in the corrupt transaction table.

56. A method as recited in claim 51 wherein said undo phase comprises undoing portions of corrupt transactions.

57. A method as recited in claim 51 wherein said undo phase comprises undoing in progress transactions at the time of a data processor failure.

58. A method of detecting and recovering from data corruption of a database comprising the steps of logging information about reads of a database to automatically detect and recover from logical corruption of the data in the database using a codeword matching audit algorithm for detection of said logical corruption and logging the codeword of a logical state found.

59. A method of detecting and recovering from data corruption of a database comprising the steps of:

(a) logging information about reads of a database to automatically detect and recover from physical corruption of the data in the database using a codeword matching audit algorithm for detection of said physical corruption, said physical corruption arising from bad writes of data to the database or corruption arising indirectly therefrom;

(b) storing a codeword corresponding to a value of a data item in a record of said combined log of reads and writes; and (c) performing a forward scan of a log of read and write operations wherein said forward scan adds an identity of data to a corrupt data table whenever said data has failed an audit.

60. A method of detecting and recovering from data corruption of a database comprising the steps of:

(a) logging information about reads of a database to automatically detect and recover from logical corruption of the data in the database using a codeword matching audit algorithm for detection of said logical corruption and deleting the effects of transactions from an image of the database;

(b) logging lock information in a logical redo log;

(c) recovering from data corruption using first and second phases, a first redo phase followed by an undo phase;

(d) said redo phase comprising a forward scan of a log of read and write operations; and (e) said forward scan adding an identity of data to a corrupt data table whenever said data is written by a corrupt transaction wherein said forward scan adds transactions to a corrupt transaction table whenever data is read that is identified in the corrupt data table.

* * * * *